US012414136B2

(12) United States Patent
Zhang

(10) Patent No.: US 12,414,136 B2
(45) Date of Patent: Sep. 9, 2025

(54) COMMUNICATIONS METHOD AND APPARATUS

(71) Applicant: Huawei Technologies Co., Ltd., Shenzhen (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 18/060,116

(22) Filed: Nov. 30, 2022

(65) Prior Publication Data

US 2023/0106109 A1 Apr. 6, 2023

Related U.S. Application Data

(63) Continuation of application No. PCT/CN2021/097557, filed on May 31, 2021.

(30) Foreign Application Priority Data

Jun. 1, 2020 (CN) .......................... 202010486439.5

(51) Int. Cl.
*H04W 4/00* (2018.01)
*H04W 72/0446* (2023.01)
*H04W 72/25* (2023.01)
*H04W 76/28* (2018.01)

(52) U.S. Cl.
CPC ....... *H04W 72/25* (2023.01); *H04W 72/0446* (2013.01); *H04W 76/28* (2018.02)

(58) Field of Classification Search
CPC .. H04W 72/25; H04W 76/28; H04W 72/0446
See application file for complete search history.

(56) References Cited

U.S. PATENT DOCUMENTS

| 2018/0220366 | A1* | 8/2018 | Bergström | H04W 76/28 |
| 2019/0098689 | A1* | 3/2019 | Wei | H04W 76/28 |
| 2022/0295517 | A1* | 9/2022 | Hahn | H04W 72/20 |
| 2023/0019726 | A1* | 1/2023 | Kwon | H04L 1/1822 |
| 2023/0055280 | A1* | 2/2023 | Hwang | H04W 72/20 |
| 2023/0066448 | A1* | 3/2023 | Tseng | H04W 72/20 |
| 2023/0074206 | A1* | 3/2023 | Zhang | H04L 1/1848 |

FOREIGN PATENT DOCUMENTS

| CN | 108781451 A | 11/2018 |
| CN | 110708145 A | 1/2020 |
| CN | 111148077 A | 5/2020 |
| WO | 2019028759 A1 | 2/2019 |

OTHER PUBLICATIONS

Huawei, et al., "General aspects of SL DRX for unicast", 3GPP TSG-RAN WG2 Meeting #113-e, R2-2101725, Jan. 25-Feb. 5, 2021, 5 Pages, Electronic.

Qualcomm Incorporated, "Discussion on SL DRX Timers and Others", 3GPP TSG RAN WG2 Meeting #113-bis-e, R2-2103780, Apr. 12-20, 2021, 6 Pages, E-meeting.

\* cited by examiner

*Primary Examiner* — Abdelnabi O Musa
(74) *Attorney, Agent, or Firm* — Slater Matsil, LLP

(57) ABSTRACT

This application provides a communications method and apparatus. The method includes: after receiving first sidelink control information from a first transmit-end device, a receive-end device starts a first timer. Running time of the first timer is used by the receive-end device to monitor second SCI and/or information about sidelink data transmission.

18 Claims, 14 Drawing Sheets

COMMUNICATIONS METHOD AND APPARATUS

CROSS-REFERENCE TO RELATED APPLICATIONS

This application is a continuation of International Application No. PCT/CN2021/097557, filed on May 31, 2021, which claims priority to Chinese Patent Application No. 202010486439.5, filed on Jun. 2020. disclosures of the aforementioned applications are herein incorporated by reference in their entireties.

TECHNICAL FIELD

This application relates to the field of communication technologies, and in particular, to a communications method and apparatus.

BACKGROUND

In a sidelink (SL) communication process, a transmit-end device can autonomously determine an idle transmission resource, and then send sidelink control information (SCI) to a receive-end device, to reserve a transmission resource for transmitting information about sidelink data transmission. However, in the SL communication process, if a discontinuous reception (DRX)-on duration timer (on duration timer) runs, the receive-end device can monitor a physical sidelink control channel (PSCCH) to obtain the SCI. If the DRX-on duration timer does not run, the receive-end device cannot monitor the PSCCH, and therefore the receive-end device cannot receive the SCI from the transmit-end device in time. The SCI can indicate a resource location of a physical sidelink shared channel (PSSCH). Therefore, when the receive-end device does not receive the SCI, the receive-end device cannot receive data transmission information corresponding to the SCI, and consequently, a data transmission delay is large.

SUMMARY

Embodiments of this application provide a communications method and apparatus, to shorten a data transmission delay.

To achieve the foregoing objective, the following technical solutions are used in embodiments of this application.

According to a first aspect, this application provides a communications method, and the method may be performed by a receive-end device. The receive-end device may be a terminal device, or may be a component (such as a chip system) in the terminal device. The method includes: After receiving first SCI from a first transmit-end device, the receive-end device starts a first timer based on the first SCI. Running time of the first timer is used by the receive-end device to monitor second SCI and/or information about sidelink data transmission.

According to the communications method provided in this embodiment of this application, after receiving the first SCI from the first transmit-end device, the receive-end device starts the first timer. In the running time of the first timer, the receive-end device can monitor the second SCI and/or the information about sidelink data transmission, so that time during which the receive-end device is in an active periodicity is prolonged to receive more second SCI, thereby reducing phenomena that the second SCI is not received in time. Correspondingly, when the receive-end device monitors the second SCI in time, the receive-end device can receive data transmission information in time, thereby reducing a data transmission delay.

In a possible design, that the receive-end device receives the first SCI from the first transmit-end device includes: The receive-end device receives the first SCI from the first transmit-end device in running time of a second timer. The running time of the second timer is used by the receive-end device to monitor sidelink control information and/or information about sidelink data transmission.

Herein, when running of the second timer of the receive-end device expires, the receive-end device cannot receive information from another device. Therefore, even if the first transmit-end device sends the first SCI to the receive-end device, the receive-end device cannot receive the first SCI. In the running time of the second timer of the receive-end device, the receive-end device is in an active periodicity, and can receive information from another device, thereby improving a rate of successfully receiving the first SCI by the receive-end device.

In a possible design, that the receive-end device starts a first timer based on the first SCI includes: The receive-end device starts the first timer if data transmission indicated by the first SCI is initial transmission. The receive-end device starts the first timer if data transmission indicated by the first SCI is retransmission and retransmitted data is in new transmission for the receive-end device (that is, previous transmission of the data is not detected by the receive-end device).

To be specific, when the first SCI indicates new data or initially transmitted data, the receive-end device receives SCI that indicates initial transmission; or when the first SCI indicates retransmitted data and the receive-end device receives the first SCI for the first time, the receive-end device receives SCI that indicates initial transmission. "When the first SCI indicates retransmitted data and the receive-end device receives the first SCI for the first time" means that the receive-end device receives, for the first time, the first SCI scheduling the retransmitted data.

"Initial transmission" is specific to a terminal device that starts a DRX inactivity timer. For example, when a terminal device 1 sends a transport block (TB) 1 to a terminal device 2 for the first time, the receive-end device 2 does not receive the TB 1 from the terminal device 1. That the TB 1 from the terminal device 1 is not received includes: SCI from the terminal device 1 is not correctly demodulated, or the TB 1 from the terminal device 1 is not correctly received. The terminal device 2 does not start the DRX inactivity timer. Next, when the terminal device 1 sends the TB 1 to the terminal device 2 again, the receive-end device 2 receives the TB 1 from the terminal device 1. In this case, the terminal device 2 receives the TB 1 for the first time, and the terminal device 2 starts the DRX inactivity timer. That the TB 1 from the terminal device 1 is received includes: The SCI from the terminal device 1 is correctly demodulated, or the TB 1 from the terminal device 1 is correctly received. In addition, initial transmission may also be referred to as initial transmission.

For example, the first timer specifies duration in which the receive-end device is continuously in an active state after successfully decoding first SCI that indicates initial transmission, or duration in which the receive-end device is continuously in an active state or an on state after initially successfully decoding first SCI that indicates retransmission or successfully decoding, for the first time, the first SCI that indicates retransmission. A unit of the duration is any one of a slot, a mini-slot, and a symbol. The duration may be determined based on at least one of a quantity of slots, a quantity of mini-slots, or a quantity of symbols.

When data transmission indicated by the first SCI is initial transmission or the first SCI indicating retransmission is received by the receive-end device for the first time, data transmission information indicated by the first SCI may fail to be received. When the receive-end device fails to receive the data transmission information, because the first timer of the receive-end device is started, in a subsequent period of time, the receive-end device is still in an active periodicity and can continue to receive information from the first transmit-end device. If the first transmit-end device retransmits the foregoing data transmission information or initially transmits other data transmission information, the receive-end device can still receive the foregoing data transmission information, thereby improving efficiency of transmitting data transmission information, and improving detection reliability.

It should be noted that, on the receive-end device side, a sidelink physical layer transmits, to a media access control (MAC) layer, at least one of a sidelink HARQ process ID, a new data indicator (NDI), a source (SRC) ID, a destination (DEST) ID, a zone ID, a HARQ enabled state, a HARQ disabled state, a reserved periodicity, a reserved time domain resource, and a reserved frequency domain resource. For example, the sidelink physical layer of the receive-end device transmits the reservation periodicity, the reserved time domain resource, the reserved frequency domain resource, the sidelink HARQ process ID, and the NDI to the MAC layer. For another example, the sidelink physical layer of the receive-end device transmits the reservation periodicity, the reserved time domain resource, the sidelink HARQ process ID, and the NDI to the MAC layer. For still another example, the sidelink physical layer of the receive-end device transmits the reservation periodicity, the reserved time domain resource, and the sidelink HARQ process ID to the MAC layer.

When a sidelink DRX mechanism is performed, a MAC entity in the MAC layer monitor a PSCCH or SCI based on any one or more sidelink timers. In one embodiment, the MAC entity monitors the PSCCH or the SCI based on at least one of the first timer, the second timer, or a retransmission timer. In another embodiment, the MAC entity monitors the PSCCH based on at least one of the reserved periodicity, the reserved time domain resource, the reserved frequency domain resource, the sidelink HARQ process ID, and the NDI that are indicated by the first SCI.

In a possible design, that the receive-end device starts a first timer based on the first SCI includes: The receive-end device starts the first timer if the receive-end device determines that sidelink transmission indicated by the first SCI is new transmission.

In a possible design, that the receive-end device starts a first timer based on the first SCI includes: The receive-end device starts the first timer if sidelink transmission indicated by the first SCI is new transmission, or the receive-end device starts the first timer if sidelink transmission indicated by the first SCI is not new transmission and sidelink transmission is new transmission for the receive-end device. For example, "sidelink transmission indicated by the first SCI is not new transmission" may be specifically: Data transmission indicated by the first SCI is retransmission and retransmitted data is new data for the receive-end device. "Data transmission indicated by the first SCI is retransmission" may also be understood as "the first SCI indicates that data scheduled this time is in retransmission", or "the first SCI indicates that this is data retransmission". For example, that data transmission is retransmission may be indicated by using a HARQ process number in combination with the NDI, or may be directly indicated by using the NDI.

It should be understood that "sidelink transmission is new transmission" is determined by the receive-end device. "Indicating that sidelink transmission is new transmission" is information in the first SCI sent by the first transmit-end device.

In a possible design, the first SCI indicates a resource reservation periodicity.

In a possible design, the second SCI includes at least SCI that is in a first target periodicity and/or the second target periodicity and that indicates that sidelink data transmission is initial transmission. The first target periodicity is a resource reservation periodicity for receiving the first SCI, and the second target periodicity is a resource reservation periodicity after the first target periodicity.

In a possible design, the communications method in this embodiment of this application further includes: The receive-end device receives first configuration information from a network device. The first configuration information indicates the running time of the first timer.

In this way, when the receive-end device starts the first timer, the first timer runs based on the running time indicated by the first configuration information, so that the network device manages a running status of the first timer of the receive-end device.

In a possible design, the communications method in this embodiment of this application further includes: The receive-end device determines the running time of the first timer based on at least one transmission resource indicated by the first SCI. "Based on at least one transmission resource indicated by the first SCI" is "based on a location of the at least one transmission resource indicated by the first SCI" or "based on a location of a time domain resource occupied by the at least one transmission resource indicated by the first SCI". The first SCI indicates a resource location of at least one transmission resource, the at least one transmission resource includes a time domain resource used to carry the second SCI, and the running time of the first timer overlaps at least the time domain resource used to carry the second SCI.

In this way, when the receive-end device starts the first timer, the running time of the first timer overlaps at least the time domain resource used to carry the second SCI. Therefore, when the first transmit-end device sends the second SCI to the receive-end device by using a reserved transmission resource, the receive-end device can receive the second SCI from the first transmit-end device in time, to avoid a case in which the receive-end device omits to receive the second SCI because the receive-end device is not in an active periodicity, thereby improving a rate of successfully receiving the second SCI.

In a possible design, the running time of the first timer includes at least a time domain resource that carries the second SCI and that is in an initial transmission resource in an $(F-1)^{th}$ resource reservation periodicity. A time domain resource that carries the second SCI and that is in an initial transmission resource in an $F^{th}$ resource reservation periodicity overlaps the running time of the second timer, and the time domain resource that carries the second SCI and that is in the initial transmission resource in the $(F-1)^{th}$ resource reservation periodicity does not overlap the running time of the second timer. A first resource reservation periodicity is a resource reservation periodicity for receiving the first SCI, where F is a positive integer, and $F \geq 3$.

The running time of the first timer includes at least the time domain resource that carries the second SCI and that is in the initial transmission resource in the $(F-1)^{th}$ resource reservation periodicity. Therefore, in an initial time domain resource that carries the second SCI and that is in the $(F-1)^{th}$ resource reservation periodicity, the receive-end device is still in an active periodicity and can receive the second SCI carried in the initial transmission resource, thereby improving a rate of successfully receiving the second SCI on a corresponding transmission resource.

In a possible design, an initial time domain resource or N time domain resources that carry the second SCI and that are in the $F^{th}$ resource reservation periodicity overlap running time of a second discontinuous reception DRX cycle of the second timer, where N is a positive integer. The second DRX cycle is a DRX cycle after a first DRX cycle. The first DRX cycle is a cycle that corresponds to a receiving moment of the first SCI and in which the second timer is located.

In other words, the $F^{th}$ resource reservation periodicity and the receiving moment of the first SCI respectively correspondingly overlap "on duration" in different DRX cycles of the second timer. Optionally, the N time domain resources carrying the second SCI are the first N time domain resources in the $F^{th}$ resource reservation periodicity that carry the second SCI.

In a possible design, the at least one transmission resource indicated by the first SCI includes a first transmission resource, and the running time of the first timer overlaps a time domain resource that carries the second SCI and that is in a first transmission resource in the second target periodicity. The second target periodicity is a resource reservation periodicity after the first target periodicity, and the first target periodicity is a resource reservation periodicity for receiving the first SCI.

In other words, on the time domain resource that carries the second SCI and that is in the first transmission resource in the second target periodicity, the receive-end device is in an active periodicity and can receive the second SCI carried in the first transmission resource in the second target periodicity, thereby reducing phenomena that the second SCI is not received in time.

In a possible design, a first transmission resource in the first target periodicity is earlier than a transmission resource receiving the first SCI, or the first transmission resource in the first target periodicity is a transmission resource to which the first SCI belongs.

In this way, when the first SCI backward indicates a reserved transmission resource or when the first SCI forward indicates a reserved transmission resource, the receive-end device can determine that first running time overlaps a time domain resource carrying the second SCI, thereby improving a rate of successfully receiving the second SCI on the foregoing transmission resource.

In a possible design, the first transmission resource in the first target periodicity is the transmission resource to which the first SCI belongs. If the at least one transmission resource indicated by the first SCI further includes a second transmission resource, the first transmission resource and the second transmission resource are located in a same resource reservation periodicity, and the first transmission resource is earlier than the second transmission resource, the running time of the first timer further overlaps at least one of the following time domain resources: a time domain resource that carries the second SCI and that is in a second transmission resource in the first target periodicity, and a time domain resource that carries the second SCI and that is in a second transmission resource in the second target periodicity.

In this way, when the first SCI forward indicates a reserved transmission resource, the receive-end device can also determine that first running time overlaps a time domain resource carrying the second SCI, thereby improving a rate of successfully receiving the second SCI on the foregoing transmission resource.

In a possible design, that the receive-end device determines the running time of the first timer based on at least one transmission resource indicated by the first SCI includes: If in a resource reservation periodicity after a resource reservation periodicity at a current moment, a time domain resource that does not overlap the running time of the second timer exists in a time domain resource carrying the second SCI, the receive-end device determines the running time of the first timer based on the at least one transmission resource indicated by the first SCI. The running time of the second timer is used by the receive-end device to monitor sidelink control information and/or information about sidelink data transmission.

In this way, the receive-end device determines the first running time if a time domain resource that does not overlap the running time of the second timer exists in a specific resource reservation periodicity, and the resource reservation periodicity is a resource reservation periodicity after the resource reservation periodicity at the current moment, so that the receive-end device is activated on a time domain resource in a corresponding transmission resource, and can monitor the second SCI, thereby reducing phenomena that SCI is not received in time.

In a possible design, the running time of the first timer is continuous or discontinuous.

In this way, when the first running time is continuous, the receive-end device can be in an active periodicity in longer time, to receive information from another device (for example, the first transmit-end device, another transmit-end device other than the first transmit-end device, or a network device), thereby reducing phenomena that SCI is not received in time. When the first running time is discontinuous, running time of the receive-end device can be reduced, so that power consumption can be reduced while a rate of successfully receiving SCI is increased.

In a possible design, if a resource reservation periodicity indicated by the first SCI is less than or equal to a first threshold, the running time of the first timer is continuous or discontinuous. If the resource reservation periodicity indicated by the first SCI is greater than or equal to a second threshold, the running time of the first timer is discontinuous. The first threshold is less than the second threshold.

In a possible design, if a resource reservation periodicity indicated by the first SCI is less than or equal to a first threshold, the running time of the first timer is continuous or discontinuous. If the resource reservation periodicity indicated by the first SCI is greater than the first threshold, the running time of the first timer is discontinuous.

For example, when a resource reservation periodicity is excessively large, the first running time is discontinuous, to shorten the running time of the first timer, reduce power consumption of the receive-end device, and increase, to a specific degree, a rate of successfully receiving SCI.

In a possible design, the communications method in this embodiment of this application further includes: After receiving third SCI from a second transmit-end device, the receive-end device starts a first timer corresponding to the third SCI. That the receive-end device starts a first timer based on the first SCI includes: The receive-end device starts the first timer corresponding to the first SCI.

In this way, after receiving different SCI, the receive-end device starts different first timers. The first timers run based on their own running time, and running time of different first timers does not affect each other, so that the running time of the first timer is not covered. Therefore, the receive-end device can receive the SCI in time to increase a rate of successfully receiving the SCI.

In a possible design, a receiving moment of the third SCI is the same as a receiving moment of the first SCI, or the receiving moment of the third SCI is different from the receiving moment of the first SCI.

For example, even if the receive-end device simultaneously receives the first SCI and the third SCI, because different SCI corresponds to different first timers, running time of different first timers does not affect each other, and the running time of the first timer is not covered, thereby increasing a rate of successfully receiving SCI.

In a possible design, the receiving moment of the first SCI is earlier than the receiving moment of the third SCI. The running time of the first timer corresponding to the first SCI is first running time, and running time of the first timer corresponding to the third SCI of the second transmit-end device is third running time. The third running time includes the first running time.

In this way, when running time of a subsequently started first timer includes running time of a previously started first timer, even if some first timers fail, it can be ensured that the receive-end device is in an active periodicity on a time domain resource in a transmission resource indicated by the first SCI, to receive SCI from the first transmit-end device in time, thereby increasing a rate of successfully receiving SCI.

In a possible design, the third SCI indicates a resource location of at least one transmission resource. The communications method in this embodiment of this application further includes: The receive-end device determines the third running time based on the first running time and the third SCI.

In other words, the receive-end device still determines the third running time with reference to a transmission resource reserved by the third SCI, so that the receive-end device can still successfully receive SCI on the transmission resource reserved by the third SCI.

In a possible design, that the receive-end device determines the third running time based on the first running time and the third SCI includes: After determining second running time based on the third SCI, the receive-end device uses a union of the first running time and the second running time as the third running time. The second running time overlaps at least a time domain resource that carries SCI on the at least one transmission resource indicated by the third SCI.

In this way, the receive-end device takes a union to determine running time of a subsequently started first timer, so that the running time of the subsequently started first timer includes running time of a previously started first timer, so as to prevent the receive-end device from omitting control information and data transmission information on a reserved transmission resource.

In a possible design, the first SCI is first-level SCI in two levels of SCI, or the first SCI is second-level SCI in the two levels of SCI, or the first SCI is the first-level SCI and the second-level SCI in the two levels of SCI.

According to a second aspect, this application provides a communications method, and the method may be performed by a transmit-end device. The transmit-end device may be a terminal device, or may be a component (such as a chip system) in the terminal device. The method includes: After the transmit-end device determines k first transmission resources, the transmit-end device sends first SCI to a receive-end device on the k first transmission resources. A time domain resource that carries the first SCI and that is in the k first transmission resources overlaps running time of a second timer, where k is a positive integer and 1(1. The k first transmission resources are transmission resources reserved by the transmit-end device. The running time of the second timer is used by the transmit-end device to monitor sidelink control information and/or information about sidelink data transmission.

According to the communications method provided in this embodiment of this application, the transmit-end device determines that the time domain resource that carries the first SCI and that is in the k first transmission resources overlaps the running time of the second timer. The running time of the second timer of the transmit-end device is consistent with running time of a second timer of the receive-end device. Therefore, when the transmit-end device sends the first SCI on the k first transmission resources, the receive-end device is in an active periodicity and can receive the first SCI, so that it is possible for the receive-end device to receive the first SCI in time, thereby improving transmission efficiency of the first SCI.

In a possible design, the k first transmission resources are the first k first transmission resources in K first transmission resources. The K first transmission resources are transmission resources reserved by the transmit-end device. K is a positive integer and K≥k.

For example, each first transmission resource can forward indicate a reserved transmission resource. To be specific, if the receive-end device receives the first SCI transmitted on the k first transmission resources, the receive-end device can determine, based on a state indicated by the first SCI for a transmission resource, a first transmission resource after the k first transmission resources, and further continue to receive the first SCI on the first transmission resource after the k first transmission resources, to improve utilization of the transmission resource, so that the receive-end device can receive more first SCI.

In a possible design, k is a predefined parameter. Alternatively, the communications method in this embodiment of this application further includes: The transmit-end device receives second configuration information from a network device. The second configuration information indicates a value of k.

In this way, the transmit-end device may reserve, based on a predefined value or the value of k indicated by the second configuration information, a first transmission resource that overlaps the running time of the second timer.

In a possible design, that the transmit-end device determines k first transmission resources includes: The transmit-end device detects signal strength of a second transmission resource. The second transmission resource overlaps running time of a preset timer. The transmit-end device determines at least K first transmission resources based on the signal strength of the second transmission resource. The transmit-end device determines the k first transmission resources from the at least K first transmission resources based on a status of overlapping between the at least K first transmission resources and the running time of the second timer. The preset timer includes at least one of the following timers: a first timer, the second timer, and retransmission timer. Running time of the first timer is used by the transmit-end device to monitor sidelink control information and/or information about sidelink data transmission.

In other words, when performing a sidelink DRX mechanism, the transmit-end device can reserve k first transmission resources, and k first transmission resources overlap the running time of the second timer. The running time of the second timer of the transmit-end device is consistent with the running time of the second timer of the receive-end device. Therefore, when the transmit-end device sends the first SCI to the receive-end device by using the k first transmission resources, the receive-end device is also in an active periodicity and can receive the first SCI from the transmit-end device, thereby improving transmission validity of the first SCI.

In a possible design, that the transmit-end device determines at least K first transmission resources based on the signal strength of the second transmission resource includes: The transmit-end device determines the at least K first transmission resources based on the signal strength of the second transmission resource if duration in which the second transmission resource overlaps the running time of the preset timer meets preset duration.

In a possible design, the signal strength of the second transmission resource includes at least one of reference signal received power RSRP, a received signal strength indicator RSSI, and a signal to interference plus noise ratio SINR.

In a possible design, the first SCI indicates a resource reservation periodicity, and the k first transmission resources are transmission resources in one resource reservation periodicity. In other words, when performing the sidelink DRX mechanism, the transmit-end device can also reserve a periodic transmission resource.

In a possible design, the first SCI is first-level SCI in two levels of SCI, or the first SCI is second-level SCI in the two levels of SCI, or the first SCI is the first-level SCI and the second-level SCI in the two levels of SCI.

According to a third aspect, this application provides a communications apparatus, and the apparatus may be the receive-end device in the first aspect. The apparatus includes a processor, a transceiver, and a memory. The transceiver is configured to receive first SCI from a first transmit-end device. The processor is configured to start a first timer based on the first SCI. Running time of the first timer is used by the receive-end device to monitor second SCI and/or information about sidelink data transmission.

In a possible design, the transceiver is specifically configured to receive the first SCI from the first transmit-end device in running time of a second timer. The running time of the second timer is used by the receive-end device to monitor sidelink control information and/or information about sidelink data transmission.

In a possible design, the processor is specifically configured to start the first timer if it is determined that sidelink transmission indicated by the first SCI is new transmission.

In a possible design, the processor is specifically configured to: start the first timer if it is determined that sidelink transmission indicated by the first SCI is new transmission; or start the first timer if the first SCI indicates that sidelink transmission is not new transmission and sidelink transmission is new transmission for the receive-end device.

In a possible design, the second SCI includes at least SCI that is in a first target periodicity and that indicates that sidelink data transmission is initial transmission, or SCI that is in a second target periodicity and indicates that sidelink data transmission is initial transmission. The first target periodicity is a resource reservation periodicity for receiving the first SCI, and the second target periodicity is a resource reservation periodicity after the first target periodicity.

In a possible design, the transceiver is configured to receive first configuration information from a network device. The first configuration information indicates the running time of the first timer.

In a possible design, the first SCI indicates a resource location of at least one transmission resource, the at least one transmission resource indicated by the first SCI includes a time domain resource used to carry the second SCI, and the processor is further configured to determine the running time of the first timer based on the at least one transmission resource indicated by the first SCI. The running time of the first timer overlaps at least the time domain resource used to carry the second SCI.

In a possible design, the running time of the first timer includes at least a time domain resource that carries the second SCI and that is in an initial transmission resource in an $(F-1)^{th}$ resource reservation periodicity. A time domain resource that carries the second SCI and that is in an initial transmission resource in an $F^{th}$ resource reservation periodicity overlaps the running time of the second timer, and the time domain resource that carries the second SCI and that is in the initial transmission resource in the $(F-1)^{th}$ resource reservation periodicity does not overlap the running time of the second timer. A first resource reservation periodicity is a resource reservation periodicity for receiving the first SCI, where F is a positive integer, and F≥3.

In a possible design, the initial or N time domain resources that carry the second SCI and that are in the $F^{th}$ resource reservation periodicity overlap running time of a second DRX cycle of the second timer. The second DRX cycle is a DRX cycle after a first DRX cycle, and the first DRX cycle is a cycle that is of the second timer and that corresponds to a receiving moment of the first SCI. N is a positive integer. Optionally, the N time domain resources carrying the second SCI are the first N time domain resources in the $F^{th}$ resource reservation periodicity.

In a possible design, the running time of the first timer overlaps a time domain resource that carries the second SCI and that is in a first transmission resource in the second target periodicity. The second target periodicity is a resource reservation periodicity after the first target periodicity, the first target periodicity is a resource reservation periodicity for receiving the first SCI, and the at least one transmission resource indicated by the first SCI includes the first transmission resource.

In a possible design, a first transmission resource in the first target periodicity is earlier than a transmission resource receiving the first SCI, or the first transmission resource in the first target periodicity is a transmission resource to which the first SCI belongs.

In a possible design, the first transmission resource in the first target periodicity is the transmission resource to which the first SCI belongs. If the at least one transmission resource indicated by the first SCI further includes a second transmission resource, the first transmission resource and the second transmission resource are located in a same resource reservation periodicity, and the first transmission resource is earlier than the second transmission resource, the running time of the first timer further overlaps at least one of the following time domain resources: a time domain resource that carries the second SCI and that is in a second transmission resource in the first target periodicity, and a time domain resource that carries the second SCI and that is in a second transmission resource in the second target periodicity.

In a possible design, the processor is specifically configured to determine the running time of the first timer if in a resource reservation periodicity after a resource reservation periodicity at a current moment, a time domain resource that does not overlap the running time of the second timer exists in at least one time domain resource that carries the second SCI.

In a possible design, the running time of the first timer is continuous or discontinuous.

In a possible design, if a resource reservation periodicity indicated by the first SCI is less than or equal to a first threshold, the running time of the first timer is continuous or discontinuous. If the resource reservation periodicity indicated by the first SCI is greater than or equal to a second threshold, the running time of the first timer is discontinuous. The first threshold is less than the second threshold.

In a possible design, if a resource reservation periodicity indicated by the first SCI is less than or equal to a first threshold, the running time of the first timer is continuous or discontinuous. If the resource reservation periodicity indicated by the first SCI is greater than the first threshold, the running time of the first timer is discontinuous.

In a possible design, the transceiver is further configured to receive third SCI from a second transmit-end device. The processor is further configured to start a first timer corresponding to the third SCI. The processor is further configured to start the first timer corresponding to the first SCI.

In a possible design, a receiving moment of the third SCI is the same as a receiving moment of the first SCI, or the receiving moment of the third SCI is different from the receiving moment of the first SCI.

In a possible design, if the receiving moment of the first SCI is earlier than the receiving moment of the third SCI, third running time includes first running time. The first running time is the running time of the first timer corresponding to the first SCI, and the third running time is running time of a first timer corresponding to the second SCI of the second transmit-end device.

In a possible design, the third SCI indicates a resource location of at least one transmission resource. The processor is further configured to determine the third running time based on the first running time and the third SCI.

In a possible design, the processor is specifically configured to determine second running time according to the third SCI. The second running time overlaps at least a time domain resource that carries SCI on the at least one transmission resource indicated by the third SCI. The processor is specifically configured to use a union of the first running time and the second running time as the third running time.

In a possible design, the first SCI is first-level SCI in two levels of SCI, or the first SCI is second-level SCI in the two levels of SCI, or the first SCI is the first-level SCI and the second-level SCI in the two levels of SCI.

According to a fourth aspect, this application provides a communications apparatus, and the apparatus may be the transmit-end device in the second aspect. The apparatus includes a processor, a transceiver, and a memory. The processor is configured to determine k first transmission resources. A time domain resource that carries first SCI and that is in the k first transmission resources overlaps running time of a second timer, where k is a positive integer and k≥1. The k first transmission resources are transmission resources reserved by the transmit-end device. The running time of the second timer is used by the transmit-end device to monitor sidelink control information and/or information about sidelink data transmission. The transceiver is configured to send the first SCI to a receive-end device on the k first transmission resources.

In a possible design, the k first transmission resources are the first k first transmission resources in K first transmission resources, and the K first transmission resources are transmission resources reserved by the transmit-end device. K is a positive integer and K≥k.

In a possible design, k is a predefined parameter, or the transceiver is configured to receive second configuration information from a network device. The second configuration information indicates a value of k.

In a possible design, the processor is specifically configured to: detect signal strength of a second transmission resource, where the second transmission resource overlaps running time of a preset timer; determine at least K first transmission resources based on the signal strength of the second transmission resource; and determine the k first transmission resources from the at least K first transmission resources based on a status of overlapping between the at least K first transmission resources and the running time of the second timer.

In a possible design, the preset timer includes at least one of the following timers: a first timer, the second timer, and retransmission timer. Running time of the first timer is used by the transmit-end device to receive sidelink control information and/or information about sidelink data transmission.

In a possible design, the processor is specifically configured to determine the at least K first transmission resources based on the signal strength of the second transmission resource if duration in which the second transmission resource overlaps the running time of the preset timer meets preset duration.

In a possible design, the signal strength of the second transmission resource includes at least one of reference signal received power RSRP, a received signal strength indicator RSSI, and a signal to interference plus noise ratio SINR.

In a possible design, the first SCI indicates a resource reservation periodicity, and the k first transmission resources are transmission resources in one resource reservation periodicity.

In a possible design, the first SCI is first-level SCI in two levels of SCI, or the first SCI is second-level SCI in the two levels of SCI, or the first SCI is the first-level SCI and the second-level SCI in the two levels of SCI.

According to a fifth aspect, this application provides a communications apparatus, configured to implement a function of the receive-end device in the first aspect.

According to a sixth aspect, an embodiment of this application provides a communications apparatus, and the apparatus has a function of implementing the communications method according to any implementation of the first aspect. The function may be implemented by hardware, or may be implemented by hardware executing corresponding software. The hardware or the software includes one or more modules corresponding to the function.

According to a seventh aspect, a communications apparatus is provided, including a processor and a memory. The memory is configured to store computer execution instructions. When the communications apparatus runs, the processor executes the computer execution instructions stored in the memory, so that the communications apparatus performs the communications method according to any implementation of the first aspect.

According to an eighth aspect, an embodiment of this application provides a communications apparatus, including a processor. The processor is configured to be coupled to a memory, and perform the communications method according to any implementation of the first aspect after reading instructions in the memory.

According to a ninth aspect, this application provides a communications apparatus, configured to implement a function of the receive-end device in the second aspect.

According to a tenth aspect, an embodiment of this application provides a communications apparatus, and the apparatus has a function of implementing the communications method according to any implementation of the second aspect. The function may be implemented by hardware, or may be implemented by hardware executing corresponding software. The hardware or the software includes one or more modules corresponding to the function.

According to an eleventh aspect, an embodiment of this application provides a communications apparatus, including a processor and a memory. The memory is configured to store computer execution instructions. When the communications apparatus runs, the processor executes the computer execution instructions stored in the memory, so that the communications apparatus performs the communications method according to any implementation of the second aspect.

According to a twelfth aspect, a communications apparatus is provided, including a processor. The processor is configured to be coupled to a memory, and perform the communications method according to any implementation of the second aspect after reading instructions in the memory.

According to a thirteenth aspect, a computer-readable storage medium is provided. The computer-readable storage medium stores instructions, and when the instructions are run on a computer, the computer is enabled to perform the communications method according to any implementation of any of the foregoing aspects.

According to a fourteenth aspect, a computer program product including instructions is provided. When the computer program product is run on a computer, the computer is enabled to perform the communications method according to any implementation of any of the foregoing aspects.

According to a fifteenth aspect, a circuit system is provided. The circuit system includes a processing circuit, and the processing circuit is configured to perform the communications method according to any implementation of any of the foregoing aspects.

According to a sixteenth aspect, a chip is provided. The chip includes a processor, and the processor is coupled to a memory. The memory stores program instructions, and when the program instructions stored in the memory are executed by the processor, the communications method according to any implementation of any of the foregoing aspects is implemented.

According to a seventeenth aspect, a communications system is provided. The communications system includes the receive-end device in any implementation of the first aspect and the first transmit-end device in any implementation of the first aspect, or includes the receive-end device in any implementation of the first aspect, the first transmit-end device in any implementation of the first aspect, and the second transmit-end device in any implementation of the first aspect, or includes the receive-end device in any implementation of the second aspect and the transmit-end device in any implementation of the second aspect.

For technical effects brought by any design manner in the second aspect to the seventh aspect, refer to technical effects brought by different design manners in the first aspect. Details are not described herein again.

BRIEF DESCRIPTION OF THE DRAWINGS

FIG. 9($b$) is a schematic diagram of a running status of another first timer according to an embodiment of this application;

FIG. 9($c$) is a schematic diagram of a running status of still another first timer according to an embodiment of this application;

FIG. 9($d$) is a schematic diagram of a running status of still another first timer according to an embodiment of this application;

FIG. 10($b$) is a schematic diagram of a running status of still another first timer according to an embodiment of this application;

FIG. 10($c$) is a schematic diagram of a running status of still another first timer according to an embodiment of this application;

DETAILED DESCRIPTION OF ILLUSTRATIVE EMBODIMENTS

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. In the embodiments of this application, "a plurality of" includes two or more. In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

Technical terms and processing processes in this application are first described.

1. DRX mechanism

To reduce power consumption of a terminal device, a network device may configure a DRX mechanism for the terminal device. The DRX mechanism may be divided into two types: idle mode DRX and connected mode discontinuous reception (C-DRX). The two implementation mechanisms are different. In idle mode DRX, the terminal device mainly monitors paging of the network device, and the terminal device monitors a paging occasion once in one DRX cycle.

Figure 1:
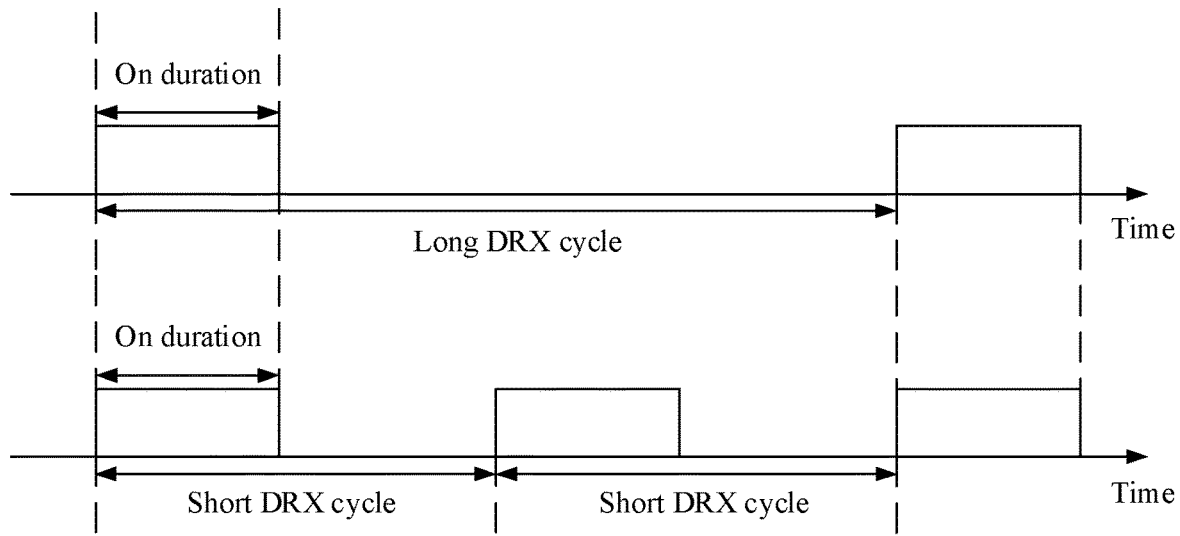
FIG. 1 is a schematic diagram of a discontinuous reception cycle according to an embodiment of this application.

In the connected mode discontinuous reception mechanism, referring to FIG. 1, the terminal device may periodically enter a sleep state, and does not need to monitor a physical downlink control channel (PDCCH), to reduce power consumption. A DRX cycle includes at least time of a DRX-on duration timer and a possible period of sleep time (opportunity for DRX). Time of a DRX-on duration timer is also referred to as "on duration", and a period of sleep time is also referred to as a "sleep periodicity", which refers to non-active time in a DRX cycle. The terminal device does not need to monitor the PDCCH.

Referring to FIG. 1, there may be two cycle types of DRX cycles, that is, a long DRX cycle (LDC) and a short DRX cycle (SDC). When configuring a DRX parameter for the terminal device, the network device needs to configure a parameter of the long DRX cycle. Optionally, the network device may configure a parameter of the short DRX cycle. In the DRX mechanism, the parameter of the long DRX cycle needs to be configured for all terminal devices. Cycle lengths of long DRX cycles of different terminal devices may be the same or different. In the DRX mechanism, the short DRX cycle is optional configuration of a system, that is, in addition to the long DRX cycle configured for each terminal device, the short DRX cycle may be configured for the terminal device. For a same terminal device, a cycle length of the long DRX cycle is an integer multiple of a cycle length of the short DRX cycle, and on duration of the long DRX cycle overlaps some on duration of the short DRX cycle, as shown in FIG. 1. In FIG. 1, duration of one long DRX cycle includes duration of two short DRX cycles, and on duration of one long DRX cycle is the same as and overlaps duration of one short DRX cycle.

It may be learned from FIG. 1 that longer time of the sleep period indicates lower power consumption of the terminal device. However, a data transmission delay correspondingly increases. Therefore, balance between power saving and a delay needs to be taken consideration into selection of the DRX cycle.

Generally, after the terminal device is scheduled and receives or sends data information in a specific subframe, the terminal device may continue to be scheduled in next several subframes. If the terminal device needs to wait for a next DRX cycle to receive or send data information again, an extra delay is brought. To reduce the foregoing delay, after being scheduled, the terminal device is continuously in an active periodicity, that is, continues to monitor the PDCCH a configured active periodicity. An implementation mechanism is as follows: Each time the terminal device is scheduled to perform initial data transmission, a DRX inactivity timer is started (or restarted), and the terminal device always remains in an active state until the DRX inactivity timer expires. The DRX inactivity timer specifies a quantity of consecutive subframes in which the terminal device is continuously in the active state after successfully decoding a PDCCH that indicates initial transmission. In other words, each time the terminal device has initially transmitted data to be scheduled, the DRX inactivity timer is restarted once.

It should be noted that an active periodicity includes running time of the DRX-on duration timer and running time of the DRX inactivity timer.

The DRX inactivity timer is used to reduce a processing delay of data information. However, if specified duration of the DRX inactivity timer is excessively long, and the DRX inactivity timer does not expire after the network device completes sending of data information, the terminal device still continues to monitor the PDCCH, and cannot enter the sleep state in time. To enable the terminal device to quickly enter the sleep state, the following is introduced into a system: a predetermined media access control (MAC) control element (CE), that is, a DRX command MAC CE, which is also referred to as a go-to-sleep CE. If the network device detects that no uplink data information or downlink data information is transmitted, the network device sends a MAC protocol data unit (PDU) to the terminal device. Correspondingly, the terminal device receives the MAC PDU from the network device. The MAC PDU includes the DRX command MAC control element. The terminal device enters the sleep state based on the DRX command MAC control element.

Figure 2:
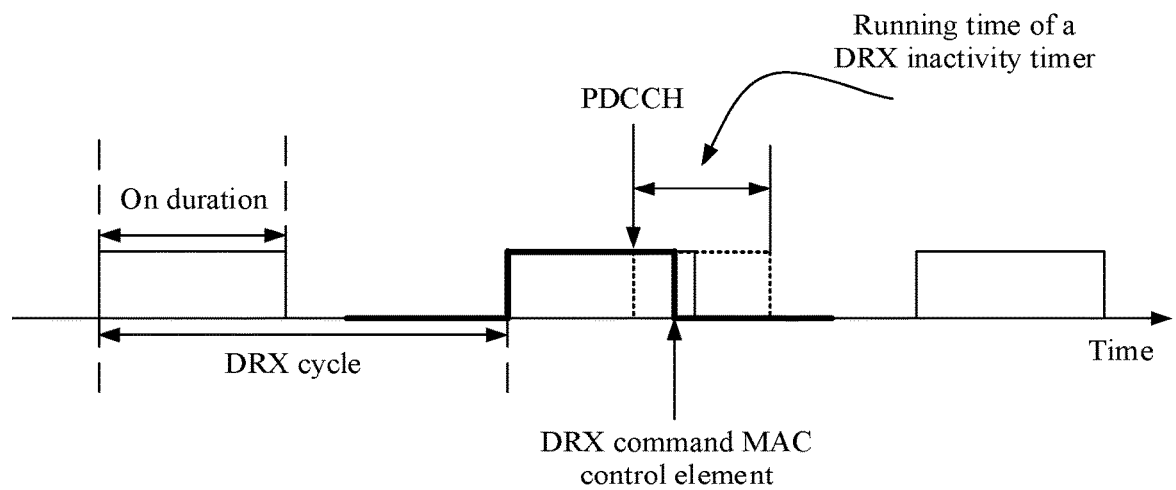
FIG. 2 is a schematic diagram of another discontinuous reception cycle according to an embodiment of this application.

Referring to FIG. 2, the terminal device periodically starts the DRX-on duration timer based on a parameter of a configured DRX cycle. Running time of the DRX-on duration timer is shown by a thin solid line in FIG. 2. In the running time of the DRX-on duration timer, the terminal device can receive a PDCCH from the network device. Time during which the terminal device can detect or receive the PDCCH is shown by a thick solid line in FIG. 2. In the running time of the DRX-on duration timer, the network device sends the PDCCH to the terminal device. Correspondingly, the terminal device receives the PDCCH from the network device. The terminal device starts the DRX inactivity timer. Running time of the DRX-on inactivity timer is shown by a dotted line in FIG. 2. In the running time of the DRX inactivity timer, the network device sends the DRX command MAC control element to the terminal device. Correspondingly, the terminal device receives the DRX command MAC control element from the network device. In this case, both the DRX-on duration timer and the DRX inactivity timer of the terminal device are in a running state. The terminal device stops running the DRX-on duration timer and the DRX inactivity timer based on the DRX command MAC control element, and the terminal device no longer receives the PDCCH, as shown by a thick solid line in FIG. 2. The terminal device enters the sleep state.

The network device configures a DRX parameter for the terminal device by using RRC signaling, for example, timer parameters such as a DRX cycle, a DRX-on duration timer, a DRX inactivity timer, a DRX-hybrid automatic repeat request (HARQ) round trip time (RTT) timer, and a DRX-retransmission timer. The terminal device needs to monitor the PDCCH in start periods of the DRX-on duration timer, the DRX inactivity timer, a downlink (DL) DRX-retransmission timer, and an uplink (UL) DRX retransmission timer. The time is also referred to as active time. In inactive time, the terminal device may enter the sleep state and does not need to monitor the PDCCH.

The DRX-on duration timer indicates duration in which the terminal device continuously monitors the PDCCH form start of the DRX cycle. For example, duration may be a quantity of subframes.

The DRX inactivity timer means the following: When the terminal device detects that the PDCCH is used to schedule initial uplink or downlink data transmission, the timer is started (or restarted) and keeps duration in which the terminal device continuously monitors the PDCCH is kept.

The DRX-hybrid automatic repeat request round trip time timer includes an uplink drx-HARQ-RTT-Timer and a downlink drx-HARQ-RTT-Timer. The downlink drx-HARQ-RTT-Timer indicates minimum duration before the terminal device expects to receive downlink retransmission assignment, and the uplink drx-HARQ-RTT-Timer indicates minimum duration before the terminal device expects to receive an uplink retransmission grant.

The DRX-retransmission timer includes a UL DRX-retransmission timer and a DL DRX-retransmission timer. The DL DRX-retransmission timer is used to stipulate maximum duration in which the terminal device expects to obtain downlink retransmission, and the UL DRX retransmission timer is used to stipulate maximum duration in which the terminal device expects to obtain an uplink retransmission grant.

In addition, the DRX parameter further includes a DRX start offset and a quantity of subframes in a long DRX cycle. The DRX start offset is a start subframe of the DRX cycle. The quantity of subframes in the long DRX cycle is a quantity of subframes occupied by a long DRX cycle. Both the two parameters are determined by using a long DRX-cycle start offset field.

2. Sidelink (SL) resource selection

Currently, in an SL communication process, data information is transmitted by using a physical sidelink shared channel (PSSCH), and control information such as SCI is carried by using a physical sidelink control channel (PSCCH). The SL communication process has two transmission modes, that is, a mode 1 and a transmission mode 2. In addition, the transmission mode 1 is also referred to as a mode 1 for short, and the transmission mode 2 is also referred to as a mode 2 for short.

In the transmission mode 1, a transmission resource of a terminal device is allocated by a network device, and the terminal device transmits information on the transmission resource allocated by the network device. The network device allocates a single transmission resource to the terminal device, or may allocate a periodic transmission resource to the terminal device.

Figure 3:
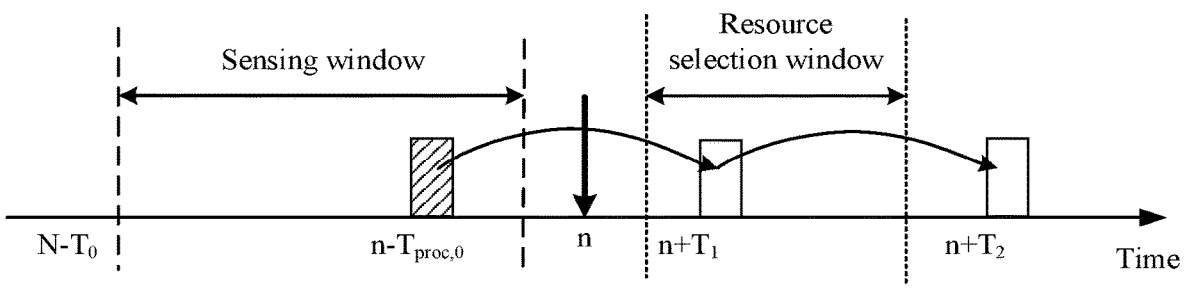
FIG. 3 is a schematic diagram of a process of reserving a transmission resource according to an embodiment of this application.

In the transmission mode 2, a terminal device determines a transmission resource in manner of sensing +reservation. Referring to FIG. 3, a specific processing process of a terminal device 1 includes the following steps.

Step 1: The terminal device 1 obtains to-be-sent data information.

For example, referring to FIG. 3, when new data information arrives at a moment n or near the moment n, the terminal device 1 needs to send the data information to another terminal device 1.

Step 2: The terminal device 1 determines a sensing window.

For example, because the terminal device 1 needs to send data information, the terminal device 1 selects a resource or reselects a resource. The sensing window is preset duration before the n moment, such as 1000 ms. For example, referring to FIG. 3, a start moment of the sensing window is denoted as $n-T_o$, and an end moment of the sensing window is denoted as $n-T_{proc,0}$.

The terminal device 1 may perform step 1 before performing step 2, or may perform step 2 before performing step 1, or may simultaneously perform step 1 and step 2. An execution sequence of step 1 and step 2 is not limited in this embodiment of this application.

Step 3. The terminal device 1 determines a resource selection window.

The resource selection window is preset duration after the n moment. For example, referring to FIG. 3, a start moment of the resource selection window is denoted as $n+T_1$, and an end moment of the resource selection window is denoted as $n+T_2$ where $T_1 \leq 4$ ms, and $40$ ms$\leq T_2 \leq 100$ ms.

Step 4: The terminal device 1 selects a transmission resource from the resource selection window based on a sensing result of the sensing window, to transmit data information.

The sensing result includes a detection result of a physical sidelink control channel (PSCCH) and a measurement value of reference signal received power (RSRP) of a physical sidelink shared channel (PSSCH) corresponding to the PSCCH.

A reserved transmission resource may be periodic or may be aperiodic. If the reserved transmission resource is periodic, a maximum of $N_{max}$ transmission resources are reserved in a resource reservation periodicity. Transmission resources in different resource reservation periodicities may transmit a same TB block, or may transmit different TB blocks. Transmission resources in a same resource reservation periodicity transmit a same TB block. Transmission resources in a same resource reservation periodicity may transmit different TB blocks. For example, a resource reservation periodicity includes three transmission resources, which may be respectively denoted as a transmission resource 1, a transmission resource 2, and a transmission resource 3. A receive-end device successfully receives a TB 1 on the transmission resource 1. In this case, the receive-end device feeds back an acknowledgement (ACK) message to a transmit-end device. To improve utilization of a transmission resource, the transmission resource 2 or the transmission resource 3 does not need to continue to transmit the TB 1, and may transmit another transport block, such as a TB 2.

For example, referring to FIG. 3, a possible specific implementation process of step 3 is described by using FIG. 3 as an example. Before step 3 is performed, all resources in the resource selection window are combined to form a candidate resource set S_A, and a quantity of resources in the candidate resource set S_A is A.

It is assumed that the measurement value that is of the RSRP of the PSSCH and that is in the sensing result is higher than a PSSCH-RSRP threshold, and the PSCCH corresponding to the PSSCH indicates that a terminal device 2 that sends the PSCCH reserves a time-frequency resource required for subsequent transmission (for example, in FIG. 3, the time-frequency resource reserved by the terminal device 2 that sends the PSCCH is a time-frequency resource that A1 corresponds to a resource A in the sensing window and that is at a time domain location of 100 ms, 200 ms, 300 ms, . . . , or the like after the resource A). In this case, the terminal device 1 excludes, from the candidate resource set S_A, the transmission resource reserved by the terminal device 2. In this case, it is recorded that a quantity of remaining resources in the candidate resource set S_A is equal to B. The terminal device further determines, from the remaining B resources in the candidate resource set S_A, a transmission resource used to transmit data information.

Figure 4:
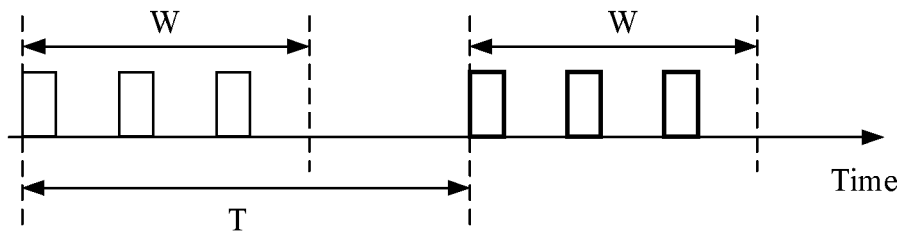
FIG. 4 is a schematic diagram of a type of distribution of a transmission resource according to an embodiment of this application.

For example, referring to FIG. 4, through the foregoing four steps, a transmission resource reserved by the terminal device 1 is shown in a block in FIG. 4. A resource reservation periodicity of the transmission resource is T. A resource reservation periodicity includes three transmission resources, that is, $N_{max}=3$.

A thin solid-line block represents a transmission resource used to transmit the TB 1, and a thick solid-line block represents a transmission resource used to transmit the TB 2. In other words, in a scenario shown in FIG. 4, different resource reservation periodicities are used to transmit different TBs.

Step 5: The terminal device 1 sends a transport block on the selected transmission resource.

A transport block includes SCI and data information, or a transport block is a PSSCH scheduled by the SCI. The SCI includes a data transmission process number and resource reservation information. The data transmission process number corresponds to a process of transmitting data information, so that the receive-end device receives the data information. The resource reservation information includes a quantity $N_{max}$ of reserved transmission resources. Optionally, if the transmission resource reserved by the terminal device 1 is periodic, the resource reservation information further includes a resource reservation periodicity. In this case, $N_{max}$ represents a quantity of reserved transmission resources in a resource reservation periodicity.

Figure 5:
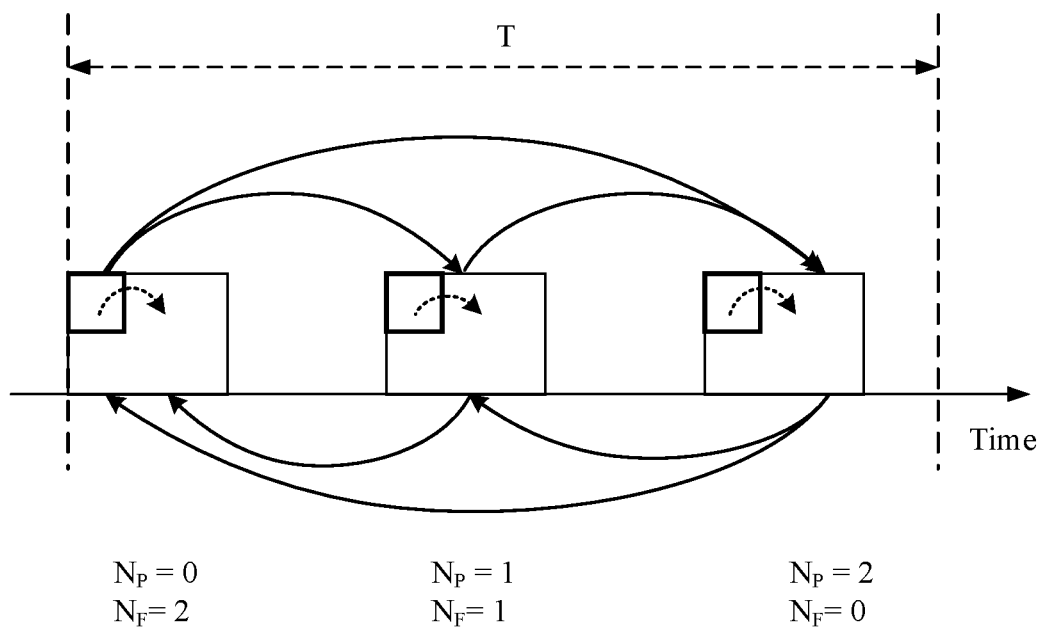
FIG. 5 is a schematic diagram of another type of distribution of a transmission resource according to an embodiment of this application.

For example, that a reserved transmission resource is a periodic transmission resource is still used as an example. Referring to FIG. 5, in a scenario shown in FIG. 5, three transmission resources are reserved in a resource reservation periodicity. A region represented by a thick solid block in FIG. 5 indicates a transmission resource carrying SCI, and a region represented by a thin solid block in FIG. 5 indicates a transmission resource carrying data information. A dashed line with an arrow in FIG. 5 indicates that SCI includes a data transmission process number used to receive data information. A solid line with an arrow in FIG. 5 indicates that SCI includes resource reservation information.

Referring to FIG. 5, SCI can forward indicate a reserved transmission resource. An arrow pointing to the right is used as an example. In a same resource reservation periodicity, for a first transmission resource in FIG. 5, a solid line pointing from the first transmission resource to a second transmission resource indicates that SCI in the first transmission resource is used to indicate a resource location of the second reserved transmission resource. A solid line pointing from the first transmission resource to a third transmission resource indicates that the SCI in the first transmission resource is used to indicate a resource location of the third reserved transmission resource. For the second transmission resource in FIG. 5, a solid line pointing from the second transmission resource to the third transmission resource indicates that SCI in the second transmission resource is used to indicate the resource location of the third reserved transmission resource.

Referring to FIG. 5, optionally, SCI can further backward (past/backward) indicate a reserved transmission resource. An arrow pointing to the left is used as an example. In a same resource reservation periodicity, for a third transmission resource in FIG. 5, a solid line pointing from the third transmission resource to a second transmission resource indicates that SCI in the third transmission resource is used to indicate a resource location of the second reserved transmission resource. A solid line pointing from the third transmission resource to a first transmission resource indicates that the SCI in the third transmission resource is used to indicate a resource location of the first reserved transmission resource. For the second transmission resource in FIG. 5, a solid line pointing from the second transmission resource to the first transmission resource indicates that SCI in the second transmission resource is used to indicate the resource location of the first reserved transmission resource.

Optionally, the SCI may perform both forward indication and backward indication. Optionally, a quantity of transmission resources that are indicated forward may be a first value configured or predefined by a network device, and/or a quantity of transmission resources that are indicated backward may be a second value configured or predefined by the network device. The first value and the second value may be a same value or different values. In an example, one transmission resource is indicated forward and one transmission resource is indicated backward.

Optionally, when the SCI is located in the last reserved transmission resource, the SCI may only backward indicate a reserved transmission resource.

In addition, the SCI can further indicate an order of a transmission resource that carries the SCI and that is in a reserved transmission resource. For example, $N_P$ represents a quantity of transmission resources in a same resource reservation periodicity that are before the transmission resource carrying the SCI. $N_F$ represents a quantity of transmission resources in the same resource reservation periodicity that are after the transmission resource carrying the SCI. Still using the scenario shown in FIG. 5 as an example, for the first transmission resource, $N_P=0$, and $N_F=2$. For the second transmission resource, $N_P=1$, and $N_F=1$. For the third transmission resource, $N_P=2$, and $N_F=0$.

It should be noted that in the embodiments of this application, a first timer may be specifically implemented as a DRX inactivity timer, and a second timer may be specifically implemented as a DRX-on duration timer. A transmission resource includes a time domain resource and a frequency domain resource, or the transmission resource is specifically a time domain resource. The transmission resource is also referred to as a resource for short. "Data information" and "data" represent a same meaning and may be replaced with each other. "Transport block" and "data packet" represent a same meaning and may be replaced with each other. In the embodiments of this application, that A and B "overlap" means that resources occupied by A and B in time domain have a same part. Specifically, that A and B "overlap" may mean the following: A includes B, B includes A, or there is no including relationship between A and B, the resources occupied in time domain are completely the same or overlap. Using a time domain resource as an example, a time domain resource of A includes at least a time domain resource of B. In this application, receiving SCI includes detecting the SCI, and/or decoding (or demodulating or parsing) the SCI. In this application, "receiving" means "received", and "not receiving" means failing in reception. Optionally, "receiving" may be understood as "correctly received". In this application "monitoring" and "detection" may be replaced with each other. In this application, preconfiguration may be preconfiguration by using radio resource control (RRC) signaling from a network device, or pre-configuration by using PC5 RRC signaling, or predefinition. In this application, ". . . is used by . . . to monitor" may be understood as ". . . is used to monitor . . . ". New transmission may be understood as new data transmission, or transmission of new data, or initial transmission of data. In this application, transmission and data transmission may be replaced with each other. ". . . indicates . . . " or "any configuration indicates . . . " means that any configuration can include a plurality of information elements, where one information element is used to indicate . . . .

In an SL communication process, if the DRX-on duration timer runs, a receive-end device can monitor a PSCCH to obtain SCI. If the DRX-on duration timer does not run, the receive-end device cannot monitor the PSCCH, and therefore the receive-end device cannot receive the SCI from a transmit-end device in time. The SCI can indicate a resource location of a physical sidelink shared channel (PSSCH). Therefore, when the receive-end device does not receive the SCI, the receive-end device cannot receive data transmission information corresponding to the SCI, and consequently, a data transmission delay is large. Optionally, the receive-end device can monitor the PSCCH in an active periodicity to obtain the SCI.

Figure 6:
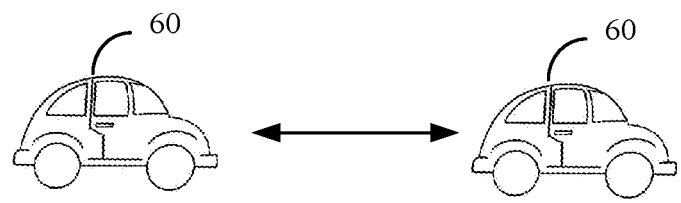
FIG. 6 is a schematic diagram of an architecture of a communications system according to an embodiment of this application.
Figure 7:
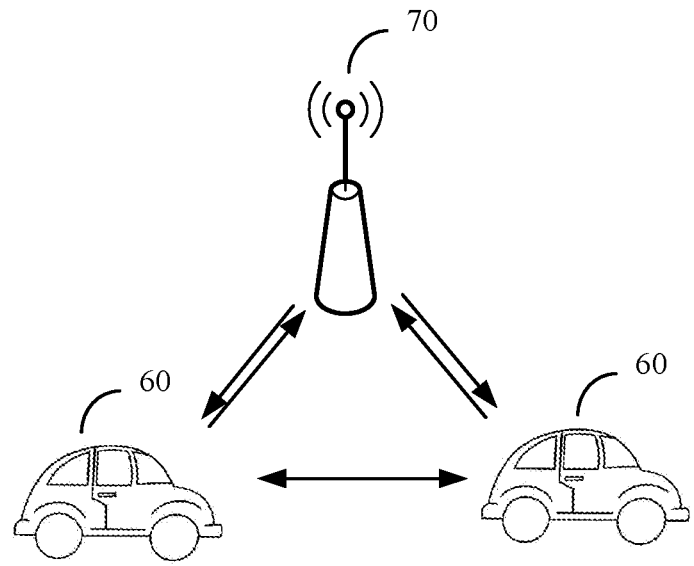
FIG. 7 is a schematic diagram of an architecture of another communications system according to an embodiment of this application.

In view of this, an embodiment of this application provides a communications method. The communications method in this embodiment of this application is applicable to a system for communication between terminal devices, such as a V2X communications system and a device to device (D2D) system. Referring to FIG. 6, the communications system includes at least two terminal devices 60, and the two terminal devices 60 can directly communicate with each other by using a side ink. Optionally, referring to FIG. 7, the communications system further includes a network device 70. The terminal device 60 may further communicate with the network device 70 (only two terminal devices 60 are shown in FIG. 6 and FIG. 7).

The terminal device 60 is mainly configured to receive or send data. Optionally, the terminal device 60 in this embodiment of this application may be a device or a component in a device that implements a function of the terminal device 60. For example, the terminal device 6o includes, for example, but is not limited to, various handheld devices with a wireless communication function, in-vehicle devices, wearable devices, computing devices, or other processing devices connected to a wireless modem. The terminal device 60 may further include a subscriber unit, a cellular phone, a smart phone, a wireless data card, a personal digital assistant (PDA) computer, a tablet computer, a handheld device, a laptop computer, a machine type communication (MTC) terminal, user equipment (UE), a mobile terminal, and the like. For another example, the terminal device 60 may be a component in any of the foregoing devices (for example, the terminal device 60 may be a chip system in any of the foregoing devices). The terminal device 60 in this embodiment of this application may be an in-vehicle module, an in-vehicle module, an in-vehicle component, an in-vehicle chip, or an in-vehicle unit that is built in a vehicle as one or more components or units, and the vehicle may implement the method in this application by using the built-in in-vehicle module, the in-vehicle module, the in-vehicle component, the in-vehicle chip, or the in-vehicle unit. In some embodiments of this application, the terminal device may alternatively be referred to as a terminal. This is uniformly described herein, and details are not described in the following.

The network device 70 is an apparatus deployed in a radio access network to provide a wireless communication function. Optionally, the network device 70 may be a device that communicates with the wireless terminal device 60 on an air interface of an access network by using one or more cells. An apparatus implementing a function of the network device 70 may be the network device 70, or may be an apparatus (for example, a chip in the network device 70) supporting the network device 70 in implementing the function. Optionally, the network device 70 may perform attribute management on the air interface. The base station device may further coordinate attribute management of the air interface.

The network device 70 includes various forms of macro base stations and micro base stations (also referred to as small cells), such as a relay device of a relay station or a chip in the relay device, a transmission/reception point (TRP), an evolved network NodeB (eNB), a gNodeB (gNB) in a next-generation network, and an evolved NodeB (ng-eNB) connected to a next-generation core network. Alternatively, in a distributed base station scenario, the network device 70 may be a base band unit (BBU) and a remote radio unit (RRU). In a cloud radio access network (CRAN) scenario, the network device 70 may be a BBU pool and an RRU.

The communications system shown in FIG. 6 and FIG. 7 may be applied to a current Long Term Evolution (LTE) or Long Term Evolution advanced (LTE-A) system, or may be applied to a 5G network currently formulated or another network in the future. Certainly, the communications system may also be applied to a system in which LTE and 5G are mixed for networking or another system. This is not specifically limited in this embodiment of this application. In different networks, the network device 70 and the terminal device 60 in the communications system may correspond to different names. A person skilled in the art may understand that the names constitute no limitation on the devices.

The communications system and a service scenario described in the embodiments of this application are intended to describe the technical solutions in the embodiments of this application more clearly, and do not constitute a limitation on the technical solutions provided in the embodiments of this application. A person of ordinary skill in the art may learn that, with evolution of a network architecture and emergence of a new service scenario, the technical solutions provided in the embodiments of this application are also applicable to a similar technical problem.

The communications method provided in the embodiments of this application is described below by using an example.

It should be noted that, in the following embodiments of this application, a name of a message between network elements or a name or the like of each parameter in the message is merely an example, and may also be another name in specific implementation. This is uniformly described herein, and details are not described below.

Figure 8:
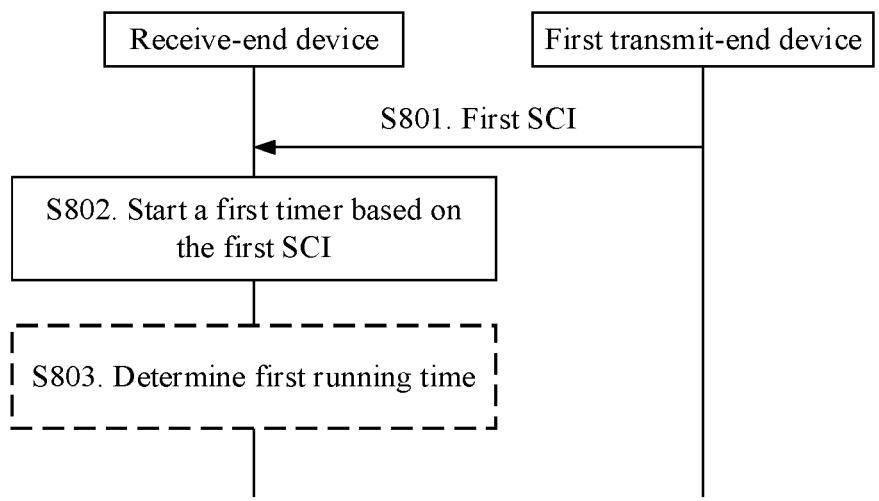
FIG. 8 is a schematic flowchart of a communications method according to an embodiment of this application.

An embodiment of this application provides a communications method, and the communications method is applied to a sidelink data transmission process. Referring to FIG. 8, the communications method may include the following steps.

S801. A first transmit-end device sends first SCI to a receive-end device. Correspondingly, the receive-end device receives the first SCI from the first transmit-end device.

The receive-end device can monitor at least one of sidelink control information and data transmission information only in an active periodicity.

The first SCI is first-level SCI in two levels of SCI, or the first SCI is second-level SCI in the two levels of SCI, or the first SCI is the first-level SCI and the second-level SCI in the two levels of SCI.

In a possible implementation, for the receive-end device, S801 may be specifically implemented as follows: The receive-end device receives the first SCI from the first transmit-end device in running time of a second timer of the receive-end device.

For example, the running time of the second timer of the receive-end device is used by the receive-end device to monitor at least one of sidelink control information and data transmission information. For example, ". . . is used by . . . to monitor" may be understood as ". . . is used to monitor . . . ". For example, that the running time of the second timer is used by the receive-end device to monitor sidelink control information and data information may be understood as: The running time of the second timer is used to monitor the sidelink control information and data information by the receive-end device.

For example, the second timer may be a DRX-on duration timer or another timer that can implement a function of the DRX-on duration timer. This is not limited in this embodiment of this application.

When running of the second timer of the receive-end device expires, the receive-end device cannot receive information from another device (such as the first transmit-end device, another transmit-end device other than the first transmit-end device, and a network device). Therefore, even if the first transmit-end device sends the first SCI to the receive-end device, the receive-end device cannot receive the first SCI. In the running time of the second timer of the receive-end device, the receive-end device is in an active periodicity, and can receive information from another device, thereby improving a rate of successfully receiving the first SCI by the receive-end device.

S802. The receive-end device starts a first timer based on the first SCI.

Running time of the first timer is described as first running time. The first running time may also be referred to as any one of the following: a time period in which the first timer is in an on state, a time period after the first timer is started, a time period in which the first timer is in a start state, a time period after the first timer is restarted, or a time period in which the first timer is in a restart state. The first running time is used by the receive-end device to monitor second SCI and/or information about sidelink data transmission. For example, ". . . is used by . . . to monitor" may be understood as ". . . is used to monitor . . . ". For example, that the running time of the first timer is used by the receive-end device to monitor the second SCI may be understood as: The running time of the first timer is used to monitor the second SCI by the receive-end device. The data transmission information includes at least one of control information in a PSCCH, control information in a PSSCH, or data information in the PSSCH. Generally, the first-level SCI is located in the PSCCH, and the second-level SCI is located in the PSSCH. Optionally, the data transmission information includes the control information in the PSCCH and the control information in the PSSCH. Optionally, the data transmission information includes the control information in the PSCCH, the control information in the PSSCH, and the data information in the PSSCH.

Optionally, the first timer may be a DRX inactivity timer.

Optionally, in this application, the DRX inactivity timer specifies duration in which the receive-end device is in an active state or an on state after successfully decoding first SCI that indicates initial transmission. That the receive-end device is in an active state means that the receive-end device is continuously in the active state, and that the receive-end device is in an on state means that the receive-end device is continuously in the on state. A unit of the duration is any one of a slot, a mini-slot, and a symbol. The duration may be determined based on at least one of a quantity of slots, a quantity of mini-slots, or a quantity of symbols.

Optionally, in this application, the DRX inactivity timer specifies duration in which the receive-end device is in an active state or an on state after initially successfully decoding first SCI that indicates initial transmission, successfully decoding, for the first time, the first SCI that indicates retransmission, or newly receiving the first SCI that indicates retransmission. That the receive-end device is in an active state means that the receive-end device is continuously in the active state, and that the receive-end device is in an on state means that the receive-end device is continuously in the on state. A unit of the duration is any one of a slot, a mini-slot, and a symbol. The duration may be determined based on at least one of a quantity of slots, a quantity of mini-slots, or a quantity of symbols.

In this application, initial transmission is new transmission. The DRX inactivity timer in this application may also be referred to as a sidelink (SL) DRX inactivity timer.

In this application, decoding may also be referred to as parsing, demodulation, or correctly receiving or correctly received. Successful decoding may also be referred to as correct decoding or decoding. Initial time is the first time or is the first time for a hybrid automatic repeat request (HARQ) process.

Whether data information is initial transmission is specific to a terminal device that starts the DRX inactivity timer. For example, when a terminal device 1 sends a transport block (TB) 1 to a terminal device 2 for the first time, the receive-end device 2 does not receive the TB 1 from the terminal device 1. That the TB 1 from the terminal device 1 is not received includes: SCI from the terminal device 1 is not correctly demodulated, or the TB 1 from the terminal device 1 is not correctly received. The terminal device 2 does not start the DRX inactivity timer. Next, when the terminal device 1 sends the TB 1 to the terminal device 2 again, the receive-end device 2 receives the TB 1 from the terminal device 1. In this case, the terminal device 2 receives the TB 1 for the first time, and the terminal device 2 starts the DRX inactivity timer. That the TB 1 from the terminal device 1 is received includes: The SCI from the terminal device 1 is correctly demodulated, or the TB 1 from the terminal device 1 is correctly received. In addition, initial transmission may also be referred to as initial transmission.

Optionally, first SCI that indicates initial transmission includes two meanings. When the first SCI includes the second-level SCI, the second-level SCI includes a new data indicator (NDI) and a HARQ process. When the NDI indicates that data is new data or initially transmitted data, it is referred to as that the receive-end device receives first SCI that indicates initial transmission. Alternatively, when the NDI indicates that data is not new data or is not initially transmitted data, if the receive-end device initially receives, or receives for the first time, or newly receives the data transmission information, it is also referred to as that the receive-end device receives first SCI that indicates initial transmission.

Related description of start of "the first timer of the receive-end device" is as follows: In a case of initial transmission, the receive-end device starts the first timer. For example, a specific implementation process of S802 may be described in the following manners.

In a first description manner, the receive-end device starts the first timer if data transmission indicated by the first SCI is initial transmission.

In a second description manner, the receive-end device starts the first timer if the receive-end device successfully decodes the first SCI and data transmission information indicated by the first SCI is data information of initial transmission.

In a third description manner, the receive-end device starts the first timer after the receive-end device successfully decodes first SCI that indicates initial sidelink transmission.

In a fourth description manner, the receive-end device starts the first timer if the receive-end device successfully decodes first SCI that indicates initial sidelink transmission and data transmission indicated by the first SCI is data information of retransmission, but the receive-end device initially receives the first SCI.

"Initial sidelink transmission" may also be referred to as "initial transmission of data in a hybrid automatic repeat request (HARQ) process". The HARQ process may also be referred to as a HARQ process number. Optionally, that the data transmission information is initially received or received for the first time includes: Data transmission information corresponding to a HARQ process indicated in corresponding second-level SCI is initially received or received for the first time, or data transmission information corresponding to a HARQ process indicated in the second-level SCI is initially received or received for the first time.

In a fifth description manner, the receive-end device starts the first timer if data transmission indicated by the first SCI is retransmission and retransmitted data is in new transmission for the receive-end device (that is, previous transmission of the data is not detected by the receive-end device).

In a sixth description manner, the receive-end device starts the first timer if the receive-end device determines that sidelink transmission indicated by the first SCI is new transmission.

For example, new transmission may be understood as new data transmission, or transmission of new data, or initial transmission of data. In this application, transmission and data transmission may be replaced with each other. The sixth description manner may be specifically understood as follows: The receive-end device starts the first timer if the receive-end device determines that sidelink data indicated by the first SCI is newly received data or data received for the first time.

For example, the receive-end device starts the first timer if the first SCI indicates that sidelink transmission is a new transmission, or the receive-end device starts the first timer if the first SCI indicates that sidelink transmission is not new transmission, and sidelink transmission is new transmission for the receive-end device. For example, "sidelink transmission indicated by the first SCI is not new transmission" may be specifically: Data transmission indicated by the first SCI is retransmission and retransmitted data is new data for the receive-end device. "Data transmission indicated by the first SCI is retransmission" may also be understood as "the first SCI indicates that data scheduled this time is in retransmission", or "the first SCI indicates that this is data retransmission". Specifically, that data transmission is retransmission may be indicated by using a HARQ process number in combination with the NDI, or may be directly indicated by using the NDI.

It should be understood that "sidelink transmission is new transmission" is determined by the receive-end device. "Indicating that sidelink transmission is new transmission" is information in the first SCI sent by the first transmit-end device.

In this application, any one of initial transmission/initial time of transmission/first time of transmission may be replaced with new transmission or initial transmission.

Optionally, the first SCI is the second-level SCI in the two levels of SCI. For example, the second-level SCI includes an initial transmission indication or a retransmission indication. Therefore, the receive-end device starts the first timer after successfully decoding the first SCI that indicates initial sidelink transmission.

Optionally, the first SCI is the first-level SCI and the second-level SCI in the two levels of SCI. For example, the second-level SCI includes an initial transmission indication or a retransmission indication, and the second-level SCI depends on decoding of the first-level SCI. Therefore, the receive-end device starts the first timer after successfully decoding the first SCI that indicates initial sidelink transmission.

For example, it is easy to understand that "the receive-end device starts the first timer if data transmission indicated by the first SCI is initial transmission" means the following: When the first SCI indicates new data or initially transmitted data, the receive-end device receives SCI that indicates initial transmission; or when the first SCI indicates retransmitted data and the receive-end device receives the first SCI for the first time, the receive-end device receives SCI that indicates initial transmission. For example, "when the first SCI indicates retransmitted data and the receive-end device receives the first SCI for the first time" means that the receive-end device receives, for the first time, the first SCI scheduling the retransmitted data.

When data transmission indicated by the first SCI is initial transmission, or the receive-end device receives the first SCI for the first time, the first SCI may fail to be received. When the receive-end device fails to receive the first SCI in initial transmission, because the first timer of the receive-end device is started, in a subsequent period of time, the receive-end device is still in an active periodicity and can continue to receive information from the first transmit-end device. If the first transmit-end device retransmits the foregoing data transmission information or initially transmits other data transmission information, the receive-end device can still receive the foregoing data transmission information, thereby improving efficiency of transmitting data transmission information, and improving detection reliability.

For example, related description of the "second SCI" is as follows.

When the first SCI further indicates a resource reservation periodicity, the second SCI includes SCI that is in a first target periodicity and that indicates initial transmission or retransmission of sidelink data transmission, or SCI that is in a second target periodicity and that indicates initial transmission or retransmission of sidelink data transmission. The first target periodicity is a resource reservation periodicity for receiving the first SCI, and the second target periodicity is a resource reservation periodicity after the first target periodicity. Herein, two examples are used for description.

Example 1: In the first target periodicity, when the receive-end device does not feed back an ACK message to the first transmit-end device after receiving transport blocks on transmission resources, or when the first transmit-end device does not receive the ACK message fed back by the receive-end device, the transmission resources in the first target periodicity transmit a same transport block. Correspondingly, in the first target periodicity, the second SCI received by the receive-end device does not include SCI used for initial transmission of information about sidelink data transmission.

Example 2: In the first target periodicity, the receive-end device feeds back an ACK message to the first transmit-end device after receiving transport blocks on transmission resources. Correspondingly, the first transmit-end device receives the ACK message fed back by the receive-end device. In this case, the transmission resources in the first target periodicity may transmit different transport blocks. Correspondingly, in the first target periodicity, the second SCI received by the receive-end device includes SCI used for initial transmission of sidelink data transmission, where data transmission information indicated by the SCI is different from data transmission information indicated by the first SCI. For example, three transmission resources are reserved in a resource reservation periodicity, which may be respectively denoted as a transmission resource 1, a transmission resource 2, and a transmission resource 3. The first transmit-end device sends a TB 1 to the receive-end device on the transmission resource 1. Correspondingly, after successfully receiving the TB 1, the receive-end device feeds back the ACK message to the first transmit-end device. For example, the ACK message is used to indicate that the TB 1 is successfully received. The first transmit-end device sends a TB 2 to the receive-end device on the transmission resource 2 or the transmission resource 3. In this scenario, SCI corresponding to the TB 1 is the foregoing first SCI, and SCI corresponding to the TB 2 is the foregoing second SCI, where the two pieces of SCI belong to the SCI that is in the first target periodicity and that indicates initial transmission of sidelink data transmission.

In the scenarios described in Example 1 and Example 2, further, transmission resources in different resource reservation periodicities may transmit different TB blocks. Therefore, correspondingly, in the second target periodicity, the second SCI received by the receive-end device includes SCI used for initial transmission of sidelink data transmission.

In the scenarios described in Example 1 and Example 2, considering that in a sidelink communication process, detection may be unreliable due to interference of another terminal surrounding the receive-end device or a half-duplex problem (to be specific, the receive-end device cannot receive information when sending information, that is, the receive-end device cannot receive and send information at the same time), "retransmission performed by the first transmit-end device" may be "new transmission" for the receive-end device. Therefore, the second SCI further includes SCI indicating that sidelink data transmission is retransmission. For example, the "SCI indicating that sidelink data transmission is retransmission" may be SCI received in the first target periodicity, or may be SCI received in the second target periodicity. In other words, the second SCI further includes SCI that is in the first target periodicity and that indicates that sidelink data transmission retransmission, or the second SCI further includes SCI that is in the second target periodicity and that indicates that sidelink data transmission is retransmission.

For example, initial transmission described from a perspective of the first transmit-end device, and is actually initial transmission. Retransmission is also described from the perspective of the first transmit-end device. Meanings of initial transmission and retransmission are different. However, on the receive-end device side, the "new transmission" needs to be explained based on the "fifth description manner", that is, the first SCI seen on the receive-end device side indicates a meaning of initial transmission.

For example, on the receive-end device side, a sidelink physical layer transmits, to a media access control (MAC) layer, at least one of a sidelink HARQ process ID, a new data indicator (NDI), a source (SRC) ID, a destination (DEST) ID, a zone ID, a HARQ enabled state, a HARQ disabled state, a reserved periodicity, a reserved time domain resource, and a reserved frequency domain resource. For example, the sidelink physical layer of the receive-end device transmits the reservation periodicity, the reserved time domain resource, the reserved frequency domain resource, the sidelink HARQ process ID, and the NDI to the MAC layer. For another example, the sidelink physical layer of the receive-end device transmits the reservation periodicity, the reserved time domain resource, the sidelink HARQ process ID, and the NDI to the MAC layer. For still another example, the sidelink physical layer of the receive-end device transmits the reservation periodicity, the reserved time domain resource, and the sidelink HARQ process ID to the MAC layer.

When a sidelink DRX mechanism is performed, a MAC entity in the MAC layer monitor a PSCCH or SCI based on any one or more sidelink timers. In one embodiment, the MAC entity monitors the PSCCH or the SCI based on at least one of the first timer, the second timer, or a retransmission timer. In another embodiment, the MAC entity monitors the PSCCH based on at least one of a reserved periodicity, a reserved time domain resource, a reserved frequency domain resource, a sidelink HARQ process ID, and an NDI that are indicated by the first SCI.

In this application, "based on the first SCI" may also be understood as "based on a first PSCCH". "Sending the first SCI" may also be understood as "sending the first PSCCH". The first SCI may also be understood as the first PSCCH. Similarly, this is applicable to the second SCI, third SCI, the first SCI, and the like, and details are not described again. This is understood as "replaced with" or "referred to as".

When the first SCI is two levels of SCI, the first-level SCI is carried on a PSCCH, and the second-level SCI is carried on a PSSCH. Therefore, in this application, when the first SCI is two levels of SCI, "based on the first SCI" may also be understood as "based on the first PSCCH and the first PSSCH", "sending the first SCI" may also be understood as "sending the first PSCCH and the first PSSCH", and the first SCI may also be understood as the first PSCCH and the first PSSCH. Similarly, this is applicable to the second SCI, third SCI, the first SCI, and the like, and details are not described again. Likewise, in this application, when the first SCI is two levels of SCI, "based on the first SCI" may also be understood as "based on the first PSCCH and a part (partial) of the first PSSCH", "sending the first SCI" may also be understood as "sending the first PSCCH and a part of the first PSSCH", and the first SCI may also be understood as the first PSCCH and a part of the first PSSCH. For example, the first PSSCH is a channel on which sidelink data scheduled by the first-level SCI in the first PSCCH and the second-level SCI in the first PSSCH is located, and a part (partial) of the first PSSCH is a part of the first PSSCH used to carry the second-level SCI.

S803. The receive-end device determines first running time.

For example, the first running time meets at least one of the following.

First, running time configured by a network device.

Second, the first SCI indicates a resource location of at least one transmission resource. The at least one transmission resource includes a time domain resource used to carry the second SCI, and the first running time overlaps at least the time domain resource used to carry the second SCI.

For example, a manner in which the receive-end device determines the first running time may be, for example, but is not limited to the following manners.

Manner 1: The network device sends first configuration information to the receive-end device. Correspondingly, the receive-end device receives the first configuration information from the network device.

For example, the first configuration information indicates the running time of the first timer. For example, the first configuration information includes a plurality of information elements. An information element is used to indicate the running time of the first timer. For example, the first configuration information indicates that the running time of the first timer is 30 slots. Each time the receive-end device starts the first timer, the running time of the first timer is 30 slots, and the first timer stops running after the running time exceeds 30 slots.

In this way, when the receive-end device starts the first timer, the first timer runs based on the running time indicated by the first configuration information, so that the network device manages a running status of the first timer of the receive-end device.

Manner 2: The receive-end device determines the first running time based on the first SCI.

For example, the first SCI indicates a resource location of at least one transmission resource. The at least one transmission resource includes a time domain resource used to carry the second SCI. The first running time overlaps at least the time domain resource used to carry the second SCI. For example, the first six symbols in a transmission resource carry the second SCI. In this case, the first running time overlaps at least the first six symbols in each transmission resource.

In this way, when the receive-end device starts the first timer, the running time of the first timer overlaps at least the time domain resource used to carry the second SCI. Therefore, when the first transmit-end device sends the second SCI to the receive-end device by using a reserved transmission resource, the receive-end device can receive the second SCI from the first transmit-end device in time, to avoid a case in which the receive-end device omits to receive the second SCI because the receive-end device is not in an active periodicity, thereby improving a rate of successfully receiving the second SCI.

For example, for each of the at least one transmission resource, one transmission resource further includes a time domain resource used to carry data transmission information. Optionally, in addition to overlapping the time domain resource used to carry the second SCI, the first running time further overlaps a part of the time domain resource used to carry the data transmission information, or the first running time further overlaps all of the time domain resource used to carry the data transmission information.

Manner 3: The receive-end device first determines the running time of the first timer in Manner 1, then adjusts the running time of the first timer in Manner 2, and uses adjusted running time as final first running time.

For example, the receive-end device first starts the first timer, and it is considered by default that the running time of the first timer is 30 slots. In the running time of the first timer, the receive-end device adjusts the running time of the first timer in Manner 2, and uses the adjusted running time as the final first running time.

In this way, the receive-end device determines the first running time in the foregoing three manners. When the first running time is determined in Manner 2 and Manner 3, the first running time meets descriptions in the following three aspects, which are specifically as follows.

According to a first aspect, the first running time is described for a case in which a time domain resource carrying the second SCI overlaps the running time of the second timer. For example, the following two possible implementations are described.

In a first possible implementation, the first running time includes at least a time domain resource that carries the second SCI and that is in an initial transmission resource in an $(F-1)^{th}$ resource reservation periodicity. For example, a time domain resource that carries the second SCI and that is in an initial transmission resource in an $F^{th}$ resource reservation periodicity overlaps the running time of the second timer, and the time domain resource that carries the second SCI and that is in the initial transmission resource in the $(F-1)^{th}$ resource reservation periodicity does not overlap the running time of the second timer. F is a positive integer and F≥3. A first resource reservation periodicity is a resource reservation periodicity for receiving the first SCI.

For example, the time domain resource that carries the second SCI and that is in the initial transmission resource in the $(F-1)^{th}$ resource reservation periodicity does not overlap the running time of the second timer, and the time domain resource that carries the second SCI and that is in the initial transmission resource in the $F^{th}$ resource reservation periodicity overlaps the running time of the second timer. Therefore, a second timer that overlaps the time domain resource carrying the second SCI is a second timer after a second timer in which the first SCI is located. For example, a receiving moment of the first SCI corresponds to running time of a first DRX cycle of the second timer. A resource carrying the first SCI overlaps the running time of the first DRX cycle of the second timer. An initial time domain resource carrying the second SCI in the $F^{th}$ resource reservation periodicity overlaps running time of a second DRX cycle of the second timer. The second DRX cycle is a DRX cycle after a first DRX cycle. For example, the second DRX cycle is a first DRX cycle after the first DRX cycle, or the second DRX cycle is a second DRX cycle after the first DRX cycle, or the second DRX cycle is the Nth DRX cycle after the first DRX cycle. This is not limited in this embodiment of this application. For description of the second timer, refer to related descriptions in S801. Details are not described herein again. For a second resource reservation periodicity to an $(F-2)^{th}$ resource reservation periodicity, initial time domain resources that are in these resource reservation periodicities and that carry the second SCI may overlap or may not overlap the running time of the second timer. This is not limited in this embodiment of this application.

Figure 9A:
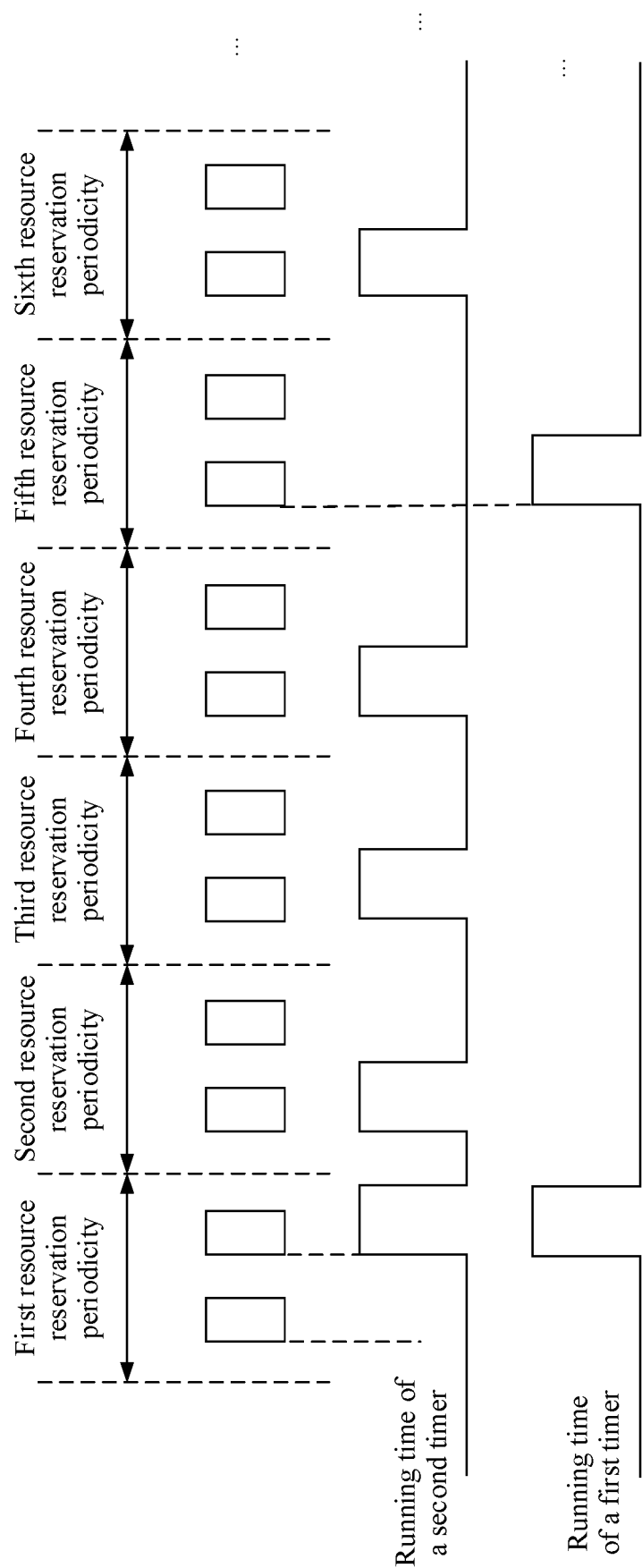
FIG. 9($a$) is a schematic diagram of a running status of a first timer according to an embodiment of this application.

For example, referring to FIG. 9(a), "F=6" is used as an example, that is, an initial time domain resource that carries the second SCI and that is in the sixth resource reservation periodicity overlaps the running time of the second timer. Correspondingly, an initial time domain resource that carries the second SCI and that is in the fifth resource reservation periodicity does not overlap the running time of the second timer. Initial time domain resources that are in the second resource reservation periodicity, the third resource reservation periodicity, and the fourth resource reservation periodicity and that carry the second SCI overlaps the running time of the second timer. In this case, the receive-end device determines that the first running time includes at least the initial time domain resource that carries the second SCI and that is in the fifth resource reservation periodicity. In this way, in the initial time domain resource that carries the second SCI and that is in the fifth resource reservation periodicity, the receive-end device is in an active periodicity, and can receive the second SCI carried in the initial transmission resource, thereby improving a rate of successfully receiving the second SCI on the corresponding transmission resource.

Figure 9B:
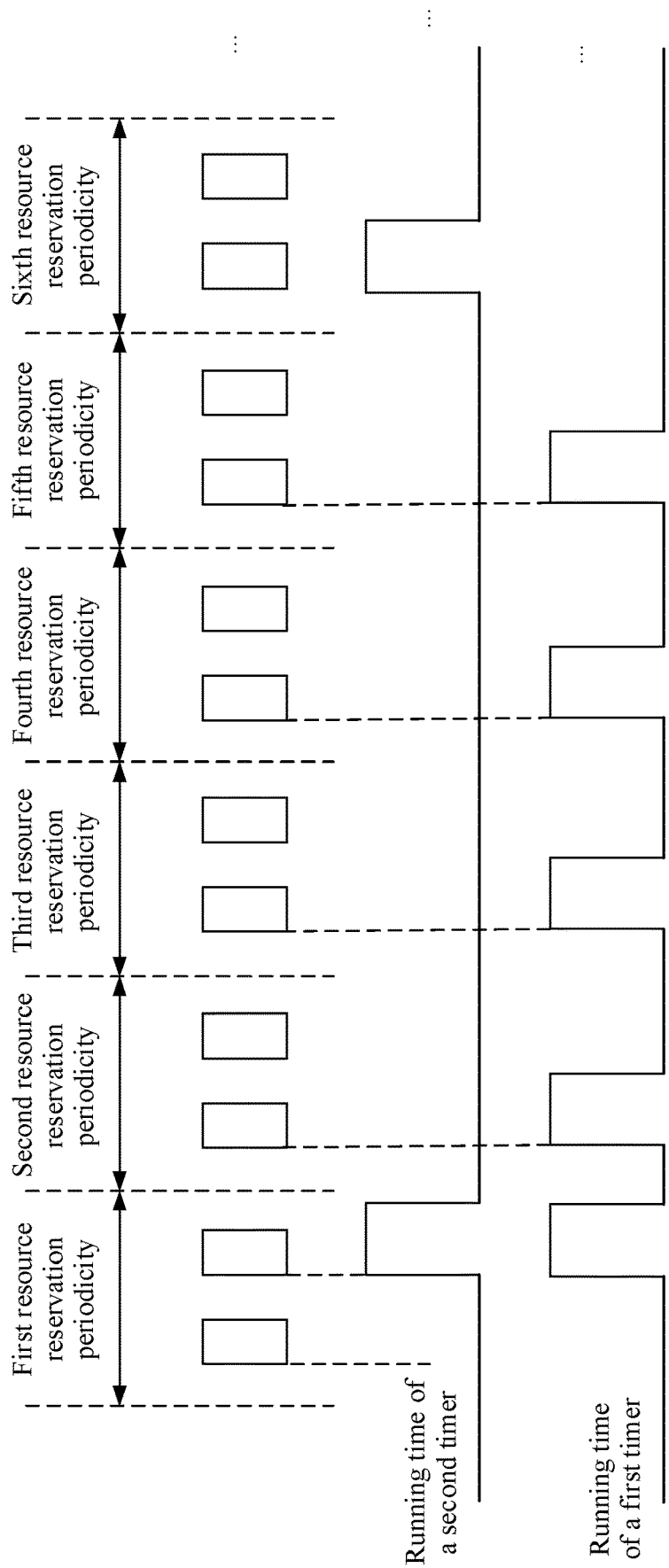

For another example, referring to FIG. 9(b), "F=6" is still used as an example. In the second resource reservation periodicity, the third resource reservation periodicity, and the fourth resource reservation periodicity, there is also a resource reservation periodicity in which an initial time domain resource that carries the second SCI does not overlap the running time of the second timer. For example, initial time domain resources that are in the three resource reservation periodicities and that carry the second SCI does not overlap the running time of the second timer. In this case, in addition to overlapping an initial time domain resource that carries the second SCI and that is in an initial transmission resource in the fifth resource reservation periodicity, the first running time may further overlap a time domain resource that carries the second SCI and that is in at least one of the three resource reservation periodicities. In this way, in initial time domain resources that are in more resource reservation periodicities and that carry the second SCI, the receive-end device is in an active periodicity, and can receive the second SCI carried in the initial transmission resources in the more resource reservation periodicities, thereby improving a rate of successfully receiving the second SCI on the corresponding transmission resource.

In a second possible implementation, the first running time separately overlaps time domain resources that carry the second SCI and that is in initial transmission resources in N resource reservation periodicities. For example, the N resource reservation periodicities are earlier than an $F^{th}$ resource reservation periodicity, and an initial time domain resource that carries the second SCI and that is in each of the N resource reservation periodicities does not overlap the running time of the second timer. An initial time domain resource that carries the second SCI and that is in the $F^{th}$ resource reservation periodicity overlaps the running time of the second timer, and an initial time domain resource that carries the second SCI and that is in an $(F-1)^{th}$ resource reservation periodicity does not overlap the running time of the second timer. A first resource reservation periodicity is a resource reservation periodicity for receiving the first SCI. Both F and N are positive integers, F≥3, and 1≤N≤(F−2). For a description of the second timer, refer to related descriptions in S801. Details are not described herein again.

For example, for a second resource reservation periodicity to the $(F-1)^{th}$ resource reservation periodicity, none of initial time domain resources that are in these resource reservation periodicities and that carry the second SCI overlaps the running time of the second timer. In this case, a value of N is (F−2).

For the second resource reservation periodicity to the $(F-1)^{th}$ resource reservation periodicity, initial time domain resources that are in some of these resource reservation periodicities and that carry the second SCI do not overlap the running time of the second timer. In this case, a value of N is less than (F−2). Because the initial time domain resource that carries the second SCI and that is in the $(F-1)^{th}$ resource reservation periodicity does not overlap the running time of the second timer, a minimum value of N equal to 1.

In this way, in the initial time domain resource that carries the second SCI and that is in each of the N resource reservation periodicities, the receive-end device is in an active periodicity, and can receive the second SCI carried in the initial transmission resources in the N resource reservation periodicities, thereby improving a rate of successfully receiving the second SCI on the corresponding transmission resource.

According to a second aspect, the first running time is described for a manner of indicating at least one transmission resource by the first SCI. Herein, two possible implementations are described herein.

In a first possible implementation, when the first SCI further indicates a resource reservation periodicity, the at least one transmission resource indicated by the first SCI includes a first transmission resource. The first running time overlaps a time domain resource that carries the second SCI and that is in a first transmission resource in a second target periodicity. For example, the first target periodicity is a resource reservation periodicity for receiving the first SCI, and the second target periodicity is a resource reservation periodicity after the first target periodicity. In other words, on the time domain resource that carries the second SCI and that is in the first transmission resource in the second target periodicity, the receive-end device is in an active periodicity and can receive the second SCI carried in the first transmission resource in the second target periodicity, thereby reducing phenomena that the second SCI is not received in time.

In the first possible implementation, further, the first transmission resource in the first target periodicity is earlier than a transmission resource receiving the first SCI. In other words, the first SCI indicates a reserved first transmission resource backward (past). For example, this may also be referred to as that the transmission resource receiving the first SCI is a resource after the first transmission resource, or the transmission resource receiving the first SCI is later than the first transmission resource in time domain.

Figure 9C:
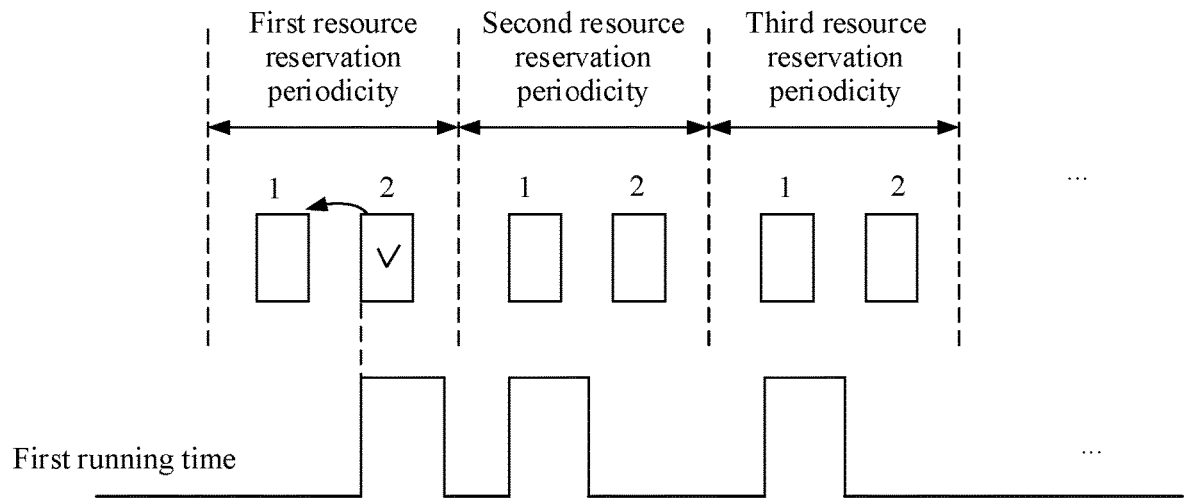

For example, referring to FIG. 9(c), a resource reservation periodicity includes at least one transmission resource, which is respectively denoted as a transmission resource 1 and a transmission resource 2. In a resource reservation periodicity, the transmission resource 1 is earlier than the transmission resource 2. For example, the transmission resource 1 is the first transmission resource. The first SCI is transmitted by using the transmission resource 2 in the first target periodicity. In this case, the first running time overlaps a time domain resource that carries the second SCI and that is in the transmission resource 1 in the second target periodicity.

In this way, when the first SCI backward indicates a reserved transmission resource, the receive-end device can also determine that the first running time overlaps a time domain resource carrying the second SCI, thereby improving a rate of successfully receiving the second SCI on the foregoing transmission resource.

In the first possible implementation, further, the first transmission resource in the first target periodicity is a transmission resource to which the first SCI belongs. In other words, the first SCI is located/carried on the first transmission resource in the first target periodicity, and occupies some symbols in the first transmission resource. The at least one transmission resource indicated by the first SCI further includes a second transmission resource, the first transmission resource and the second transmission resource are located in a same resource reservation periodicity, and the first transmission resource is earlier than the second transmission resource. In other words, the first SCI forward indicates a reserved first transmission resource. The first running time overlaps at least one of the following time domain resources:

a time domain resource that carries the second SCI and that is in a second transmission resource in the first target periodicity;

a time domain resource that carries the second SCI and that is in a first transmission resource in the second target periodicity; and a time domain resource that carries the second SCI and that is in a second transmission resource in the second target periodicity.

Figure 9D:
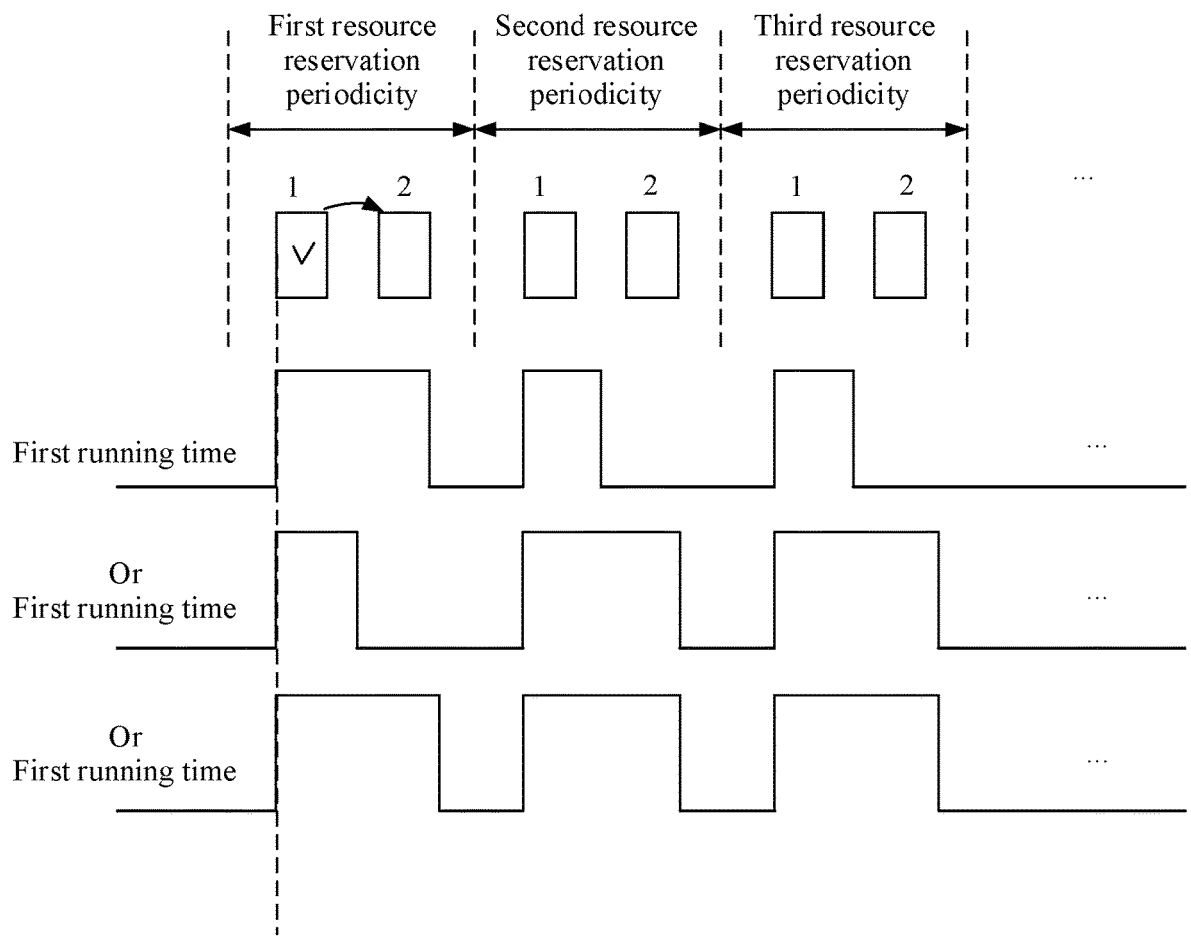

For example, referring to FIG. 9(d), a resource reservation periodicity includes at least one transmission resource, which is respectively denoted as a transmission resource 1 and a transmission resource 2. In a resource reservation periodicity, the transmission resource 1 is earlier than the transmission resource 2. For example, the transmission resource 1 is the first transmission resource, and the transmission resource 2 is the second transmission resource. The first SCI is transmitted on the transmission resource 1 in the first target periodicity. In this case, cases in which the first running time overlaps a reserved time domain resource are classified into the following three types.

In a first type, the first running time, such as the first running time shown in a first row in FIG. 9(d), overlaps a time domain resource that carries the second SCI and that is in the transmission resource 1 in the second target periodicity, and overlaps a time domain resource that carries the second SCI and that is in the transmission resource 2 in the first target periodicity.

In a second type, the first running time, such as the first running time shown in a second row in FIG. 9(d), overlaps a time domain resource that carries the second SCI and that is in the transmission resource 1 in the second target periodicity, and overlaps a time domain resource that carries the second SCI and that is in the transmission resource 2 in the second target periodicity.

In a third type, the first running time, such as the first running time shown in a third row in FIG. 9(d), overlaps a time domain resource that carries the second SCI and that is in the transmission resource 1 in the second target periodicity, overlaps a time domain resource that carries the second SCI and that is in the transmission resource 2 in the first target periodicity, and overlaps a time domain resource that carries the second SCI and that is in the transmission resource 2 in the second target periodicity.

In this way, when the first SCI forward indicates a reserved transmission resource, the receive-end device can also determine that first running time overlaps a time domain resource carrying the second SCI, thereby improving a rate of successfully receiving the second SCI on the foregoing transmission resource.

In a second possible implementation, if the at least one transmission resource includes a first transmission resource, and the first transmission resource is earlier than a transmission resource receiving the first SCI, the first running time overlaps at least a time domain resource that carries the second SCI and that is in a first transmission resource in the second target periodicity. For example, the first target periodicity is a resource reservation periodicity for receiving the first SCI, and the second target periodicity is a resource reservation periodicity after the first target periodicity. For example, the first transmission resource is earlier than the transmission resource receiving the first SCI, which may also be referred to as follows: The transmission resource receiving the first SCI is a resource after the first transmission resource, or the transmission resource receiving the first SCI is later than the first transmission resource in time domain.

If the at least one transmission resource includes the first transmission resource and a second transmission resource, the first transmission resource and the second transmission resource are located in a same resource periodicity, and the first transmission resource is earlier than the second transmission resource. If the transmission resource receiving the first SCI is the first transmission resource and is located in the first target periodicity, the first running time overlaps at least one of the following:

a time domain resource that carries the second SCI and that is in a second transmission resource in the first target periodicity;

a time domain resource that carries the second SCI and that is in a first transmission resource in the second target periodicity; and a time domain resource that carries the second SCI and that is in a second transmission resource in the second target periodicity.

For example, for descriptions of the first target periodicity and the second target periodicity, refer to related descriptions in the "second SCI". Details are not described herein again.

It should be noted that, in the second possible implementation, SCI transmitted on the first transmission resource in the first target periodicity may be an SCI that fails to be received by the receive-end device, or may be an SCI that indicates aperiodic transmission. This is not limited in this embodiment of this application.

According to a third aspect, continuity of the first running time is described, which is specifically as follows: The first running time may be continuous or may be discontinuous. For example, "the first running time is continuous" means that after the first timer is started, the first timer is always in a running state until a preset moment is reached. "The first running time is discontinuous" means that there is an interval in a period of time. Optionally, when duration of the first timer is 35 slots, and the first timer is intermittent two times and is intermittent for five slots each time, a length of on duration of actual running of the first timer is 25 slots. Optionally, when duration of the first timer is 25 slots, and the first timer is intermittent two times and is intermittent for five slots each time, a length of on duration of actual running of the first timer is 25 slots, and plus time of two intervals, a length of actual on duration is 35 slots. For example, intermittent running of the first timer may mean that the first timer is intermittent one time, or may mean that the first timer is intermittent a plurality of times. The first timer may run based on a specific periodicity, or may run aperiodically.

When the first SCI further indicates a resource reservation periodicity, if the resource reservation periodicity is less than or equal to a first threshold, the first running time is consecutive or may be discontinuous. If the resource reservation periodicity is greater than or equal to a second threshold, the first running time is discontinuous. For example, the first threshold is less than the second threshold. Alternatively, if the resource reservation periodicity is less than or equal to the first threshold, the first running time is continuous or may be discontinuous. If the resource reservation periodicity is greater than the first threshold, the first running time is discontinuous. Alternatively, if the resource reservation periodicity is less than the first threshold, the first running time is continuous or may be discontinuous. If the resource reservation periodicity is greater than or equal to the first threshold, the first running time is discontinuous. Herein, the first threshold and the second threshold may be preconfigured values.

Two examples are used for description below.

Figure 10A:
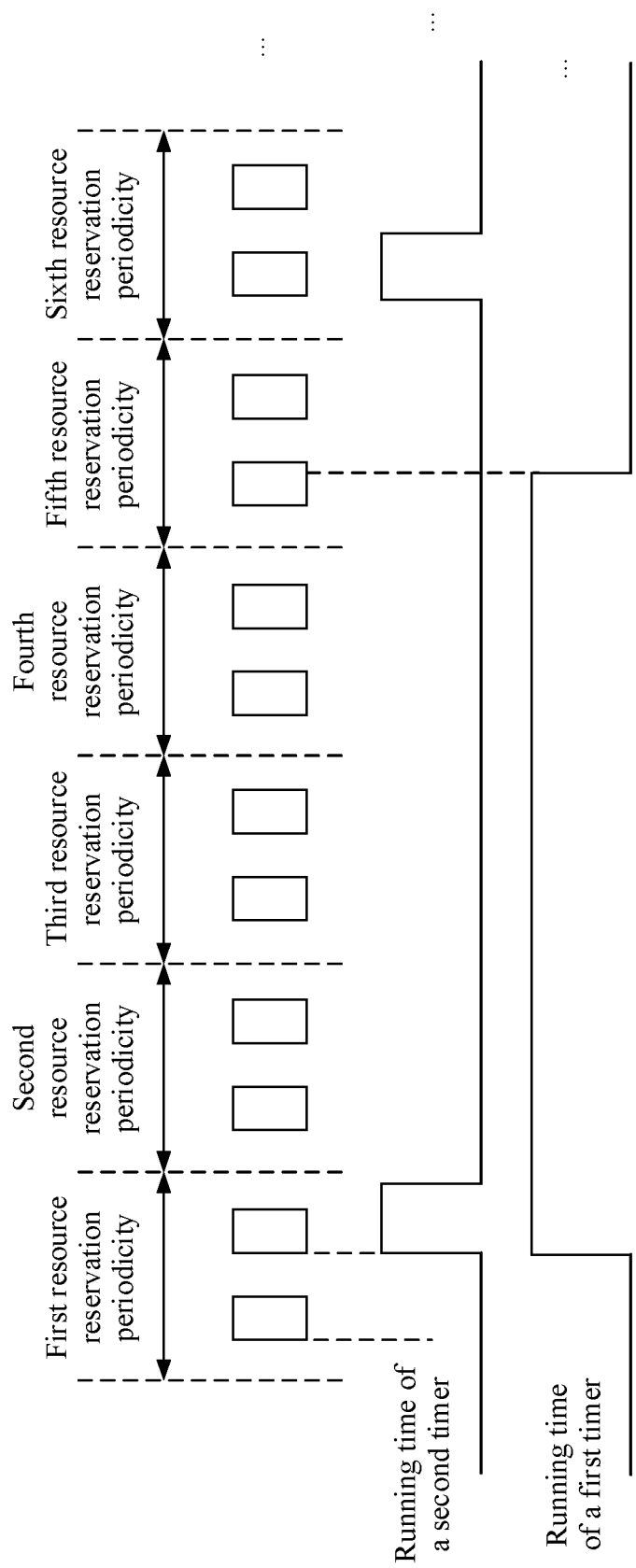
FIG. 10($a$) is a schematic diagram of a running status of still another first timer according to an embodiment of this application.
Figure 10B:
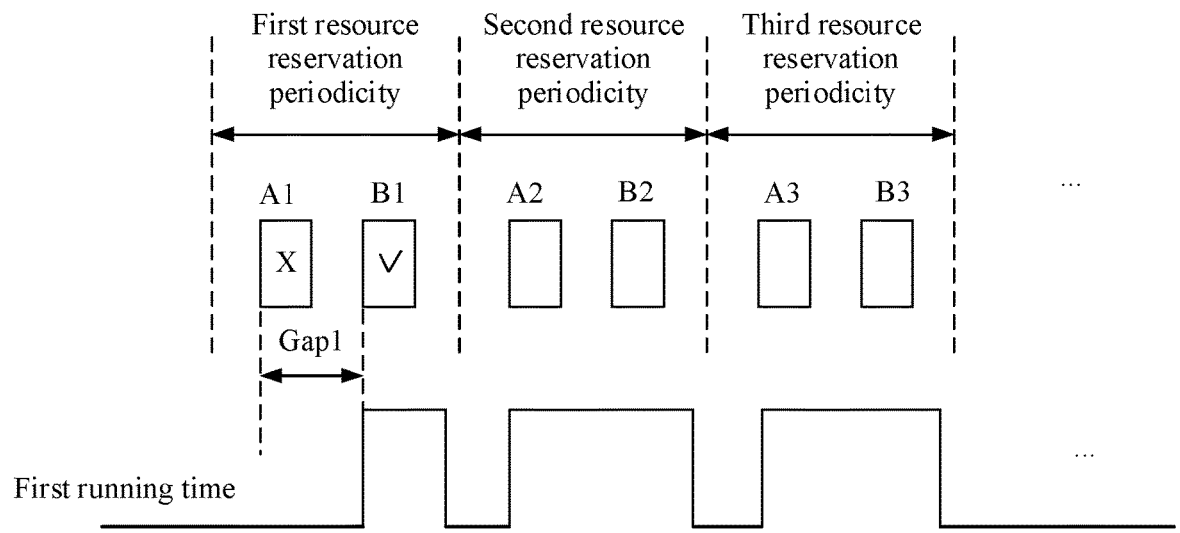
Figure 10C:
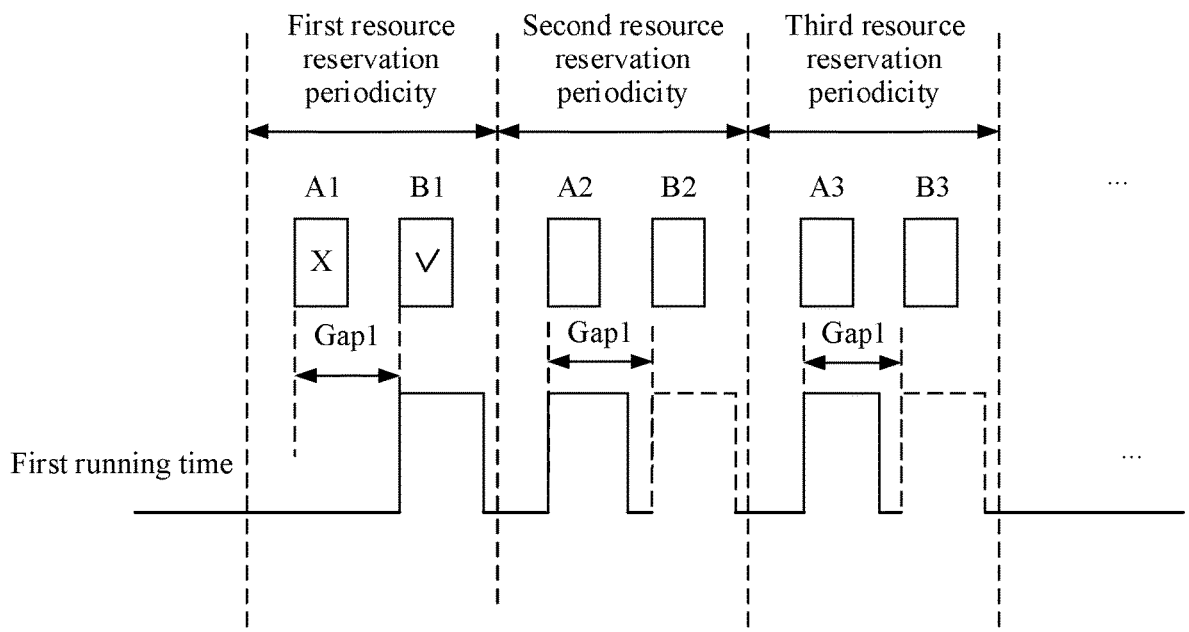

Example 1: Referring to FIG. 10(a), a scenario in which the resource reservation periodicity is less than or equal to the first threshold is used as an example, and a first resource reservation periodicity is a resource reservation periodicity for receiving the first SCI. An initial time domain resource that carries the second SCI and that is in each of a second resource reservation periodicity to an $(F-1)^{th}$ resource reservation periodicity does not overlap the running time of the second timer. An initial time domain resource that carries the second SCI and that is in an $F^{th}$ resource reservation periodicity overlaps the running time of the second timer. For example, F is a positive integer and F≥3. In one possible design, after the first timer is started, the first timer runs at least until the initial time domain resource that carries the second SCI and that is in the $(F-1)^{th}$ resource reservation periodicity ends, as shown in FIG. 10(a). Herein, the running time of the second timer in FIG. 10(a) is described. In FIG. 10(a), the running time that is of the second timer and that corresponds to the first resource reservation periodicity and the running time that is of the second timer and that corresponds to a sixth resource reservation periodicity may be the same or may be different. Generally, the running time is the same. When an RRC signaling modifies on duration in a DRX cycle, the running time may be different. In the case shown in FIG. 10(a), the first running time is continuous. In another possible design, after the first timer is started, the first running time overlaps at least the initial time domain resource that carries the second SCI and that is in the $(F-1)^{th}$ resource reservation periodicity. A running periodicity of the first timer is equal to the foregoing resource reservation periodicity, as shown in FIG. 10(b) or FIG. 10(c). In this case, the first running time is discontinuous.

In the scenario in Example 1, in a possible implementation process, in FIG. 10(b), a block represents a transmission resource. A resource reservation periodicity includes two transmission resources, which are respectively denoted as a transmission resource A and a transmission resource B are respectively recorded. For example, two transmission resources in the first resource reservation periodicity are respectively denoted as a transmission resource A1 and a transmission resource B1, two transmission resources in the second resource reservation periodicity are respectively denoted as a transmission resource A2 and a transmission resource B2, and two transmission resources in the third resource reservation periodicity are respectively denoted as a transmission resource A3 and a transmission resource B3. Transmission resources in a subsequent resource reservation periodicity are denoted by analogy. "The receive-end device fails to receive, on the transmission resource A1, the first SCI from the first transmit-end device, or the receive-end device successfully receives, on the transmission resource A1, the first SCI from the first transmit-end device, but a transmission resource indicated by the first SCI on the transmission resource A1 is aperiodic" is shown by a block marked with "X" in FIG. 10(b). "The receive-end device successfully receives, on the transmission resource A2, the first SCI from the first transmit-end device" is shown by a block marked with "√" in FIG. 10(b). A running periodicity of the first timer is equal to the foregoing resource reservation periodicity, and each start moment of the first timer is prolonged forward by specific gap time. The gap time is a difference between a start moment of the transmission resource A and a start moment of the transmission resource B in a same resource reservation periodicity, as shown in by Gap1 in FIG. 10(b).

In the scenario in Example 1, in another possible implementation process, in FIG. 10(c), a block represents a transmission resource. For a manner of denoting each transmission resource, refer to related descriptions in FIG. 10(b). Details are not described herein again. "The receive-end device fails to receive, on the transmission resource A1, the first SCI from the first transmit-end device, or the receive-end device successfully receives, on the transmission resource A1, the first SCI from the first transmit-end device, but a transmission resource indicated by the first SCI on the transmission resource A1 is aperiodic" is shown by a block marked with "X" in FIG. 10(c). "The receive-end device successfully receives, on the transmission resource A2, the first SCI from the first transmit-end device" is shown by a block marked with "√" in FIG. 10(c). A running periodicity of the first timer is equal to the foregoing resource reservation periodicity, and each start moment of the first timer is pushed forward by specific gap time. For description of the time gap, refer to the description in FIG. 10(b). Details are not described herein again. In FIG. 10(c), a solid broken line in the second resource reservation periodicity indicates running time that is of the first timer and that is updated by the receive-end device, and a dashed broken line in the second resource reservation periodicity indicates running time that is of the first timer and that is not updated by the receive-end device. A solid broken line in the third resource reservation periodicity indicates running time that is of the first timer and that is updated by the receive-end device, and a dashed broken line in the third resource reservation periodicity indicates running time that is of the first timer and that is not updated by the receive-end device.

Example 2: A scenario in which the resource reservation periodicity is greater than or equal to the second threshold is used as an example, and a first resource reservation periodicity is a resource reservation periodicity for receiving the first SCI. An initial time domain resource that carries the second SCI and that is in each of a second resource reservation periodicity to an $(F-1)^{th}$ resource reservation periodicity does not overlap the running time of the second timer. An initial time domain resource that carries the second SCI and that is in an $F^{th}$ resource reservation periodicity overlaps the running time of the second timer. For example, F is a positive integer and F≥3. In other words, the $F^{th}$ resource periodicity is an earliest resource periodicity that is in a resource periodicity after the first resource periodicity and in which a time domain resource that carries the second SCI and that is in an initial transmission resource overlaps the running time of the second timer. If after the first timer is started, the first timer runs at least until the initial time domain resource that carries the second SCI and that is in the $(F-1)^{th}$ resource reservation periodicity ends, because the resource reservation periodicity is relatively large, the first running time is excessively long, and therefore power consumption of the receive-end device is excessively large. To reduce power consumption of the receive-end device, the first running time is usually set to be discontinuous. For example, if after the first timer is started, the first running time overlaps the initial time domain resource that carries the second SCI and that is in the $F^{th}$ resource reservation periodicity, a running periodicity of the first timer is equal to the foregoing resource reservation periodicity.

In this way, when the first running time is continuous, the receive-end device can be in an active periodicity in longer time, to receive information from another device (for example, the first transmit-end device, another transmit-end device other than the first transmit-end device, or a network device), thereby reducing phenomena that SCI is not received in time. When the first running time is discontinuous, running time of the receive-end device can be reduced, so that power consumption can be reduced while a rate of successfully receiving SCI is increased. When a resource reservation periodicity is excessively large, the first running time is discontinuous, to shorten the running time of the first timer, reduce power consumption of the receive-end device, and increase, to a specific degree, a rate of successfully receiving SCI.

A triggering condition for performing S80 3 is further described below, which may be, for example, but is not limited to the following manner: The receive-end device determines the first running time if in a resource reservation periodicity after a resource reservation periodicity at a current moment, a time domain resource that does not overlap the running time of the second timer exists in at least one time domain resource that carries the second SCI.

For example, "a time domain resource that does not overlap the running time of the second timer" may be one time domain resource in a resource reservation periodicity, or may be a plurality of time domain resources in a resource reservation periodicity. "A time domain resource that does not overlap the running time of the second timer" may refer to a time domain resource in the first k transmission resources in K transmission resources reserved in a resource reservation periodicity. Both K and k are positive integers, and $1 \leq k \leq K$.

For example, a resource reservation periodicity in which "a time domain resource that does not overlap the running time of the second timer exists" may be one resource reservation periodicity, or may be a plurality of resource reservation periodicities. A resource reservation periodicity in which "a time domain resource that does not overlap the running time of the second timer exists" refers to the first resource reservation periodicity after the resource reservation periodicity at the current moment. In other words, the receive-end device determines the first running time if a transmission resource that does not overlap the running time of the second timer exists in a next resource reservation periodicity of the resource reservation periodicity at the current moment. Certainly, a resource reservation periodicity in which "a time domain resource that does not overlap the running time of the second timer exists" may refer to the second resource reservation periodicity after the resource reservation periodicity at the current moment or the third resource reservation periodicity after the resource reservation periodicity at the current moment. This is not limited in this embodiment of this application.

In this way, the receive-end device determines the first running time if a time domain resource that does not overlap the running time of the second timer exists in a specific resource reservation periodicity, and the resource reservation periodicity is a resource reservation periodicity after the resource reservation periodicity at the current moment, so that the receive-end device is activated on a time domain resource in a corresponding transmission resource, and can monitor the second SCI, thereby reducing phenomena that SCI is not received in time.

According to the communications method provided in this embodiment of this application, after receiving the first SCI from the first transmit-end device, the receive-end device starts the first timer. In the running time of the first timer (that is, the first running time), the receive-end device can monitor the second SCI and/or the information about sidelink data transmission, so that time during which the receive-end device is in an active periodicity is prolonged to receive more second SCI, thereby reducing phenomena that the second SCI is not received in time. Correspondingly, when the receive-end device monitors the second SCI in time, the receive-end device can receive data transmission information in time, thereby reducing a data transmission delay.

Figure 11:
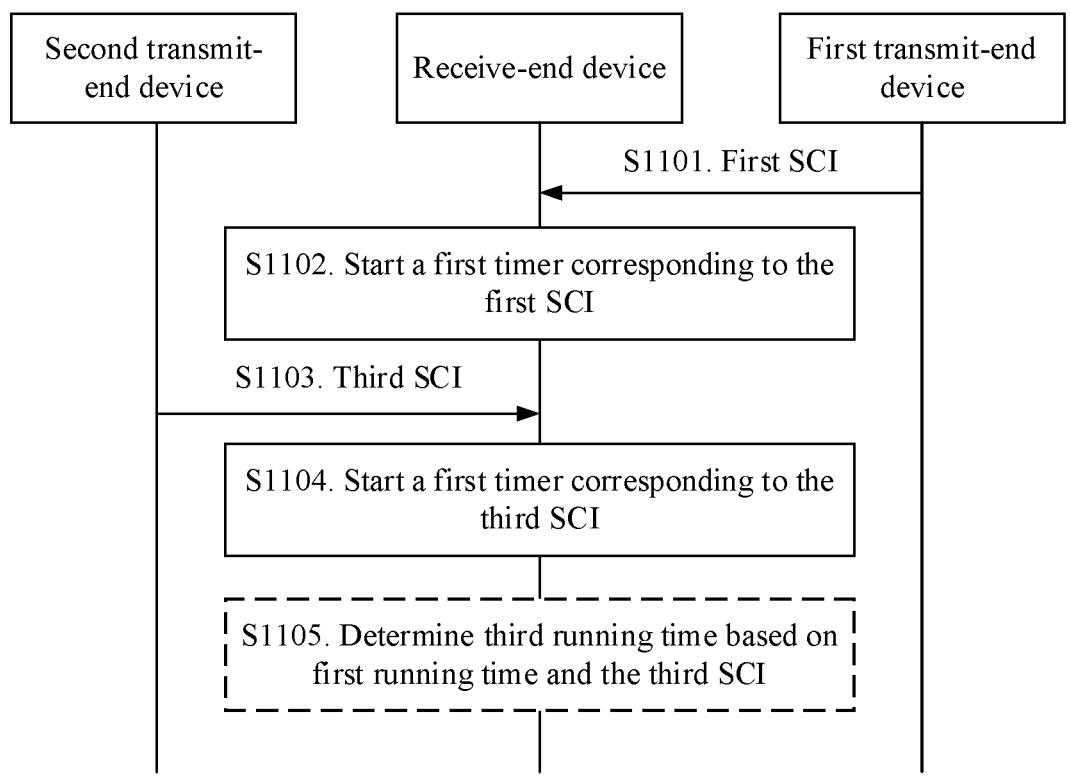
FIG. 11 is a schematic flowchart of another communications method according to an embodiment of this application.

In some embodiments, the receive-end device can further receive third SCI from a second transmit-end device. Referring to FIG. 11, the communications method in this embodiment of this application further includes the following steps.

S1101. A first transmit-end device sends first SCI to a receive-end device. Correspondingly, the receive-end device receives the first SCI from the first transmit-end device.

For example, for a specific implementation process of S1im, refer to related descriptions of S801. Details are not described herein again.

S1102. The receive-end device starts a first timer corresponding to the first SCI.

For example, for related descriptions of the first timer, refer to related descriptions of S802. Details are not described herein again.

For example, a plurality of first timers are configured for the receive-end device. After receiving the first SCI, the receive-end device starts a first timer from the plurality of first timers. The first timer is the first timer corresponding to the first SCI, and is denoted as a timer 1.

S1103. A second transmit-end device sends third SCI to the receive-end device. Correspondingly, the receive-end device receives the third SCI from the second transmit-end device.

For example, for a specific implementation process of S1103, refer to related descriptions of S801. Details are not described herein again.

S1104. The receive-end device starts a first timer corresponding to the third SCI.

For example, when a plurality of first timers are configured for the receive-end device, after receiving the third SCI, the receive-end device starts a first timer from the plurality of first timers, and the first timer is the first timer corresponding to the third SCI and is denoted as a timer 2. The timer 1 and the timer 2 are different first timers.

It should be noted that the receive-end device may first perform S1101, and then perform S1103; or the receive-end device may first perform S1103, and then perform S1101; or the receive-end device may perform S1101 and S1103 at the same time. An execution sequence of S1101 and S1103 is not limited in this embodiment of this application.

In this way, after receiving different SCI, the receive-end device starts different first timers. Each first timer runs based on its own running time, to avoid a case in which "when a first timer is used, running time of a subsequently started first timer covers running time of the previously started first timer". For example, when one first timer is configured for the receive-end device, SCI first received by the receive-end device indicates a periodically reserved transmission resource. In this case, running time of the first timer overlaps a time domain resource in the periodically reserved transmission resource. Afterwards, if SCI further received by the receive-end device indicates an aperiodically reserved transmission resource, the running time of the first timer overlaps a time domain resource in the aperiodically reserved transmission resource. Correspondingly, the first timer no longer runs on the time domain resource in the periodically reserved transmission resource indicated by the SCI, and the receive-end device cannot receive the SCI on the corresponding transmission resource in time. However, in the communications method in this embodiment of this application, the receive-end device starts different first timers for different SCI. In this way, running time of different first timers does not affect each other, so that the running time of the first timer is not covered. Therefore, the receive-end device can receive the SCI in time to increase a rate of successfully receiving the SCI.

Herein, it may also be understood as the following: The receive-end device takes a union of running time of first timers started by different transmit-end devices and/or network devices, to ensure that a receiving success rate can be ensured for any of the first transmit-end device, another transmit-end device other than the first transmit-end device, and the network device. To be specific, after receiving SCI from different transmit-end devices, the receive-end device determines running time of first timers corresponding to the transmit-end devices, and/or after receiving SCI from a network device, the receive-end device determines running time of a first timer corresponding to the network device, and then takes a union of the determined running time of the first timers, to ensure that a receiving success rate can be ensured for any of the first transmit-end device, another transmit-end device other than the first transmit-end device, and the network device.

In some embodiments, the receive-end device first performs S1101, and then performs S1103. In other words, a receiving moment of the first SCI is earlier than a receiving moment of the third SCI. For example, running time of a first timer corresponding to the second SCI of the second transmit-end device is described as third running time. The third running time includes the first running time. In other words, the third running time includes running time that is not executed by the first running time.

Figure 12:
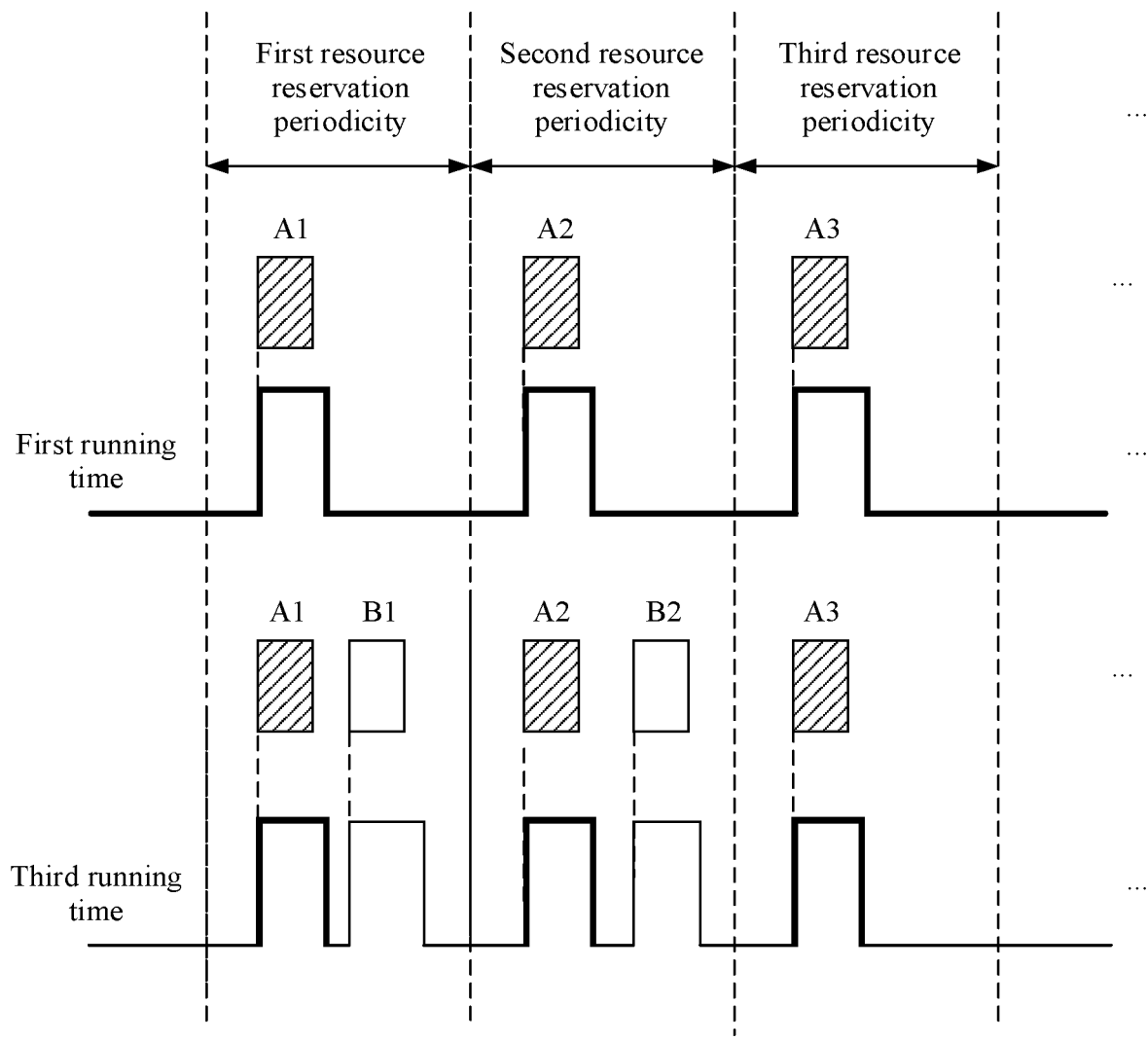
FIG. 12 is a schematic diagram of a running status of still another first timer according to an embodiment of this application.

For example, a transmission resource indicated by the first SCI is a resource set 1, and the resource set 1 includes a transmission resource A1, a transmission resource A2, and a transmission resource A3, as shown in blocks filled with oblique lines in FIG. 12. A time domain resource in the transmission resource A1 is earlier than a time domain resource in the transmission resource A2, and the time domain resource in the transmission resource A2 is earlier than a time domain resource in the transmission resource A3. A transmission resource indicated by the third SCI is a resource set 2, and the resource set 2 includes a transmission resource B1, a transmission resource B2, and a transmission resource B3, as shown in blank blocks in FIG. 12. A time domain resource in the transmission resource B1 is earlier than a time domain resource in the transmission resource B2, and the time domain resource in the transmission resource B2 is earlier than a time domain resource in the transmission resource B3. The receive-end device receives the first SCI from the first transmit-end device on the transmission resource A1, and the receive-end device receives the third SCI from the second transmit-end device on the transmission resource B1.

Referring to FIG. 12, when the time domain resources in the transmission resources in the resource set 1 and the resource set 2 are all different, the first running time overlaps the time domain resources in the transmission resources in the resource set 1 (for example, a part of the time domain resource in the transmission resource A1, the time domain resource in the transmission resource A2, and the time domain resource in the transmission resource A3), as shown by a thick broken line in FIG. 12. In addition to overlapping the time domain resources in the transmission resources in the resource set 2 (for example, a part of the time domain resource in the transmission resource B1, the time domain resource in the transmission resource B2, and the time domain resource in the transmission resource B3), as shown by a thick broken line in FIG. 12, the third running time further overlaps a time domain resource in a remaining transmission resource in the resource set 1, as shown by a thin broken line in FIG. 12. For example, the "remaining transmission resource" refers to a transmission resource later than the transmission resource B1. For example, if both the transmission resource A2 and the transmission resource A3 are later than the transmission resource B1, the "remaining transmission resource" includes the transmission resource A2 and the transmission resource A3. The third running time further overlaps the time domain resource in the transmission resource A2 and the time domain resource in the transmission resource A3.

It should be noted that, when the third running time includes the first running time, the first timer corresponding to the first SCI and the first timer corresponding to the third SCI may be a same first timer, or may be different first timers.

In this way, when running time of a subsequently started first timer includes running time of a previously started first timer, even if some first timers fail, it can be ensured that the receive-end device is in an active periodicity on a time domain resource in a transmission resource indicated by the first SCI, to receive SCI from the first transmit-end device in time, thereby increasing a rate of successfully receiving SCI.

Optionally, the receive-end device performs S1105 after performing S1103.

S1105. The receive-end device determines the third running time based on the first running time and the third SCI.

For example, for related descriptions of the first running time, refer to related descriptions of S803. Details are not described herein again. The third SCI indicates a resource location of at least one transmission resource. The transmission resource indicated by the third SCI may be periodic or may be aperiodic. The third running time includes the first running time. For details, refer to the foregoing description. Details are not described herein again.

In an actual application process, a specific implementation process of S1105 may include the following two steps.

Step 1: The receive-end device determines second running time based on the third SCI.

For example, for a specific implementation process of step 1, refer to related descriptions of S803. Details are not described herein again.

Step 2: The receive-end device uses a union of the first running time and the second running time as the third running time.

For example, "the receive-end device uses a union of the first running time and the second running time as the third running time" specifically includes: The receive-end device uses a union of time not running in the first running time and the second running time as the third running time.

Figure 13:
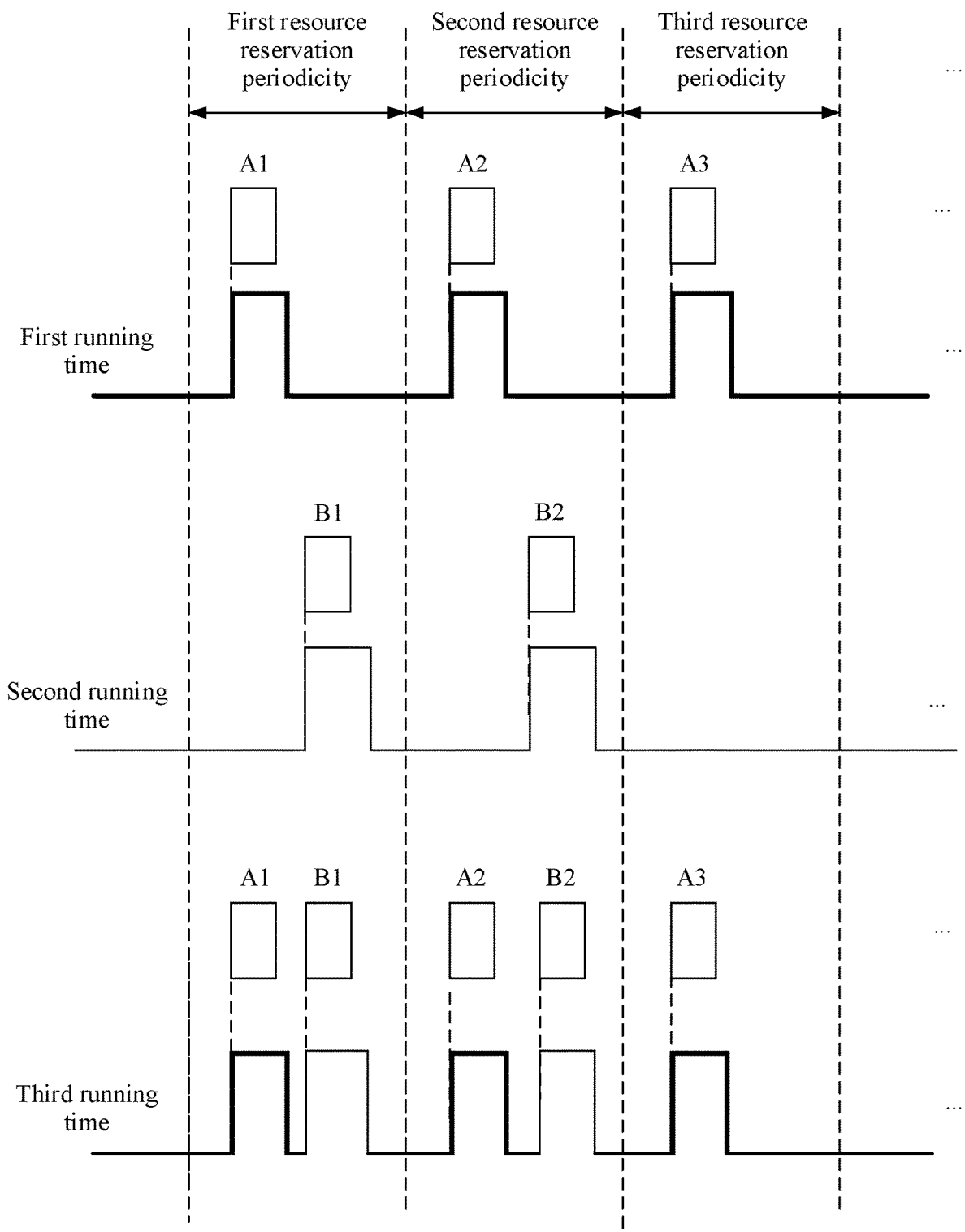
FIG. 13 is a schematic diagram of a running status of still another first timer according to an embodiment of this application.

For example, referring to FIG. 13, in FIG. 13, a block represents a transmission resource. For example, the first SCI reserves a periodic resource. A resource reservation periodicity includes one transmission resource. For example, a transmission resource in a first resource reservation periodicity is denoted as a transmission resource A1, a transmission resource in a second resource reservation periodicity is denoted as a transmission resource A2, and a transmission resource in a third resource reservation periodicity is denoted as a transmission resource A3. The first running time is shown by a thick solid line in FIG. 13. The third SCI reserves an aperiodic transmission resource, for example, a transmission resource B1 and a transmission resource B2 in FIG. 13. The second running time is shown by a thin solid line in FIG. 13. The third running time is a union of the first running time and the second running time, as shown in FIG. 13.

In this way, the receive-end device takes a union to determine running time of a subsequently started first timer, so that the running time of the subsequently started first timer includes running time of a previously started first timer, so as to prevent the receive-end device from omitting control information and data transmission information on a reserved transmission resource.

It should be noted that all the "first timers" in the communications method described in FIG. 8 to FIG. 13 refer to first timers on the receive-end device side. All the "second timers" in the communications method described in FIG. 8 to FIG. 13 refer to second timers on the receive-end device side.

Figure 14:
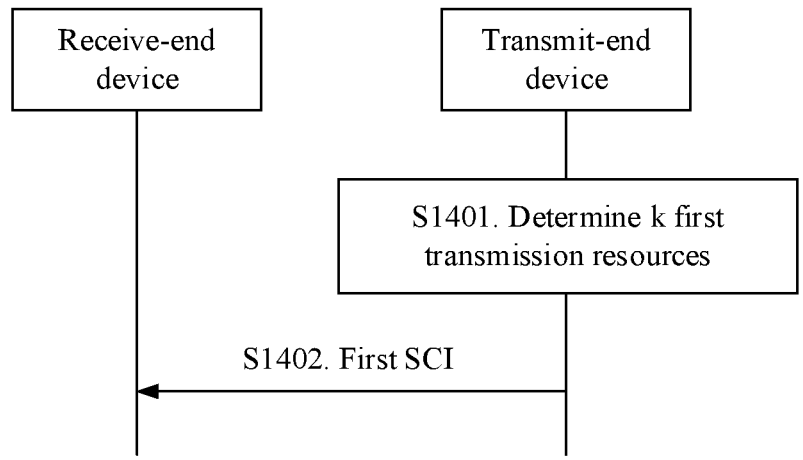
FIG. 14 is a schematic flowchart of another communications method according to an embodiment of this application.

The foregoing describes a communications method on a receive-end device side. The following describes a resource reservation process of a transmit-end device. Referring to FIG. 14, the communications method in this embodiment of this application includes the following steps.

S1401. A transmit-end device determines k first transmission resources.

For example, a time domain resource that carries first SCI and that is in the k first transmission resources overlaps running time of a second timer. For example, the k first transmission resources are resources in K first transmission resources.

For example, the running time of the second timer belongs to an active periodicity of the transmit-end device. The running time of the second timer is used by the transmit-end device to monitor sidelink control information and/or information about sidelink data transmission, or may be used by the transmit-end device to send the sidelink control information and/or the information about sidelink data transmission. Herein, the running time of the second timer may be configured by a network device. Running time of second timers of different terminal devices is consistent with each other. To be specific, if the second timer of the transmit-end device is in a running state, a second timer of a receive-end device is also in the running state. In this way, the time domain resource that carries the first SCI and that is in the k first transmission resources determined by the transmit-end device also overlaps running time of the second timer of the receive-end device. Optionally, the running time of the second timer may be configured by a sidelink transmit-end device. For example, a group header of a group configures same running time of a second timer for a group member.

For example, the first SCI is first-level SCI in two levels of SCI, or the first SCI is second-level SCI in the two levels of SCI, or the first SCI is the first-level SCI and the second-level SCI in the two levels of SCI.

For example, the K first transmission resources are transmission resources reserved by the transmit-end device. Herein, the first transmission resource may be a periodic transmission resource, or may be an aperiodic transmission resource. If the first transmission resource is a periodic transmission resource, the first SCI indicates a resource reservation periodicity, and the K first transmission resources are transmission resources in one resource reservation periodicity.

For example, both K and k are positive integers, and 1≤k≤K. Herein, the parameter k may be a predefined parameter, or may be configured by a network device. For example, the network device sends second configuration information to the transmit-end device. Correspondingly, the transmit-end device receives the second configuration information from the network device. For example, the second configuration information indicates a value of k. For example, the second configuration information includes a plurality of information elements. One information element is used to indicate the value of k. In this way, the transmit-end device may reserve, based on the value of k indicated by the second configuration information, a first transmission resource that overlaps the running time of the second timer.

For example, locations of the k first transmission resources are specifically described below.

Figure 15:
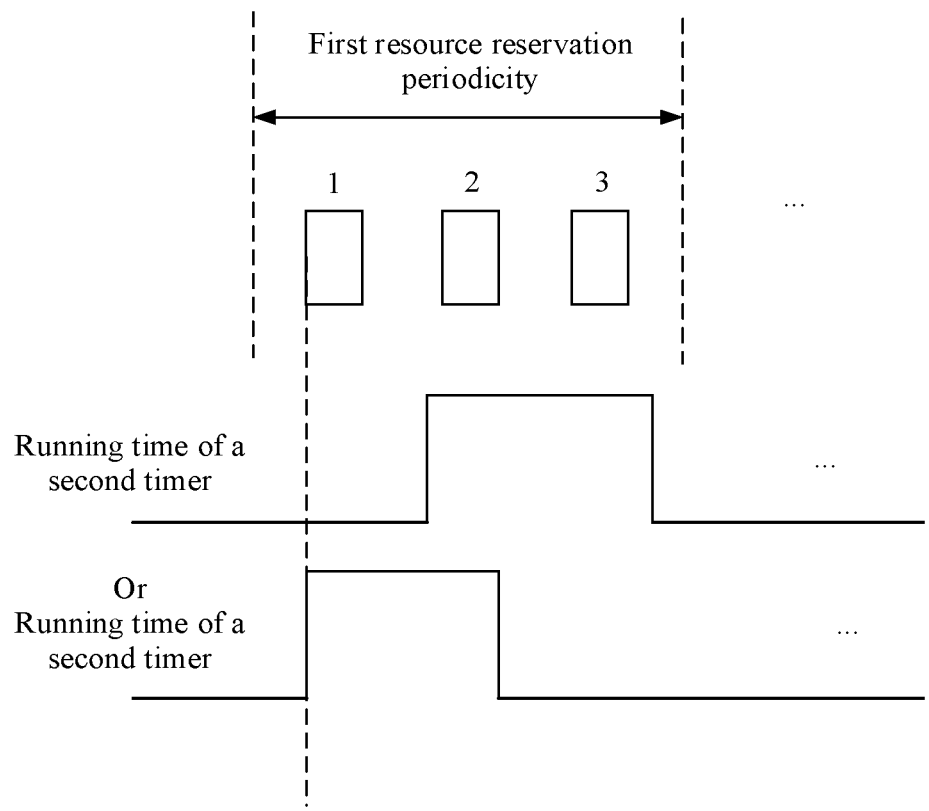
FIG. 15 is a schematic diagram of a running status of a second timer according to an embodiment of this application.

In a first case, referring to "the running time of the second timer" in a first row in FIG. 15, the k first transmission resources may be the last k first transmission resources in the K first transmission resources. For example, three transmission resources are reserved in a resource reservation periodicity, and the three transmission resources are respectively denoted as a transmission resource 1, a transmission resource 2, and a transmission resource 3. In FIG. 15, "the running time of the second timer" in the first row overlaps the transmission resource 2 and the transmission resource 3.

In a second case, referring to "the running time of the second timer" in a second row in FIG. 15, the k first transmission resources may be the first k first transmission resources in the K first transmission resources. In other words, a time domain resource that carries the first SCI and that is in the first k first transmission resources in the K first transmission resources overlaps the running time of the second timer. For example, three transmission resources are reserved in a resource reservation periodicity, and the three transmission resources are respectively denoted as a transmission resource 1, a transmission resource 2, and a transmission resource 3. In FIG. 15, "the running time of the second timer" in the second row overlaps the transmission resource 1 and the transmission resource 2. For example, each first transmission resource can forward indicate a reserved transmission resource. To be specific, if the receive-end device receives the first SCI transmitted on the k first transmission resources, the receive-end device can determine, based on a state indicated by the first SCI for a transmission resource, a first transmission resource after the k first transmission resources, and further continue to receive the first SCI on the first transmission resource after the k first transmission resources, to improve utilization of the transmission resource, so that the receive-end device can receive more first SCI.

For example, referring to FIG. 16, a specific implementation process of S1401 is as follows.

S14011. The transmit-end device detects signal strength of a second transmission resource.

For example, the second transmission resource overlaps running time of a preset timer.

The preset timer includes at least one of the following timers:
- first, a first timer, where for example, running time of the first timer is used by the transmit-end device to monitor sidelink control information and/or information about sidelink data transmission, or may be used by the transmit-end device to send the sidelink control information and/or the information about sidelink data transmission;
- second, a second timer, where for example, running time of the second timer is used by the transmit-end device to monitor sidelink control information and/or information about sidelink data transmission, or may be used by the transmit-end device to send the sidelink control information and/or the information about sidelink data transmission; and
- third, a retransmission timer, where for example, running time of the retransmission timer is used by the transmit-end device to receive sidelink control information and/or information about sidelink data transmission that are/is used for retransmission.

The foregoing descriptions o f the first timer and the second timer are applicable to another embodiment of this application, and details are not described again.

For example, duration of a sensing window is lo ms, and the running time of the second timer is 2 ms in a DRX cycle. If the transmit-end device detects only a transmission resource that overlaps the running time of the second timer, the transmit-end device needs to detect five DRX cycles. If the transmit-end device detects only a transmission resource that overlaps the running time of the foregoing three timers, the transmit-end device needs to detect less than five DRX cycles.

For example, the signal strength of the second transmission resource includes at least one of reference signal received power (RSRP), received signal strength indicator (RSSI), and signal to interference plus noise ratio (SINR). For example, the RSRP is obtained by measuring a reference signal on the second transmission resource. The RSSI is an RSSI on the second transmission resource. The SINR is obtained measuring the second transmission resource.

For example, the scenario in FIG. 3 is still used as an example. The transmit-end device detects the signal strength of the second transmission resource in the sensing window. For example, the second transmission resource may be four DRX cycles.

S14012. The transmit-end device determines at least K first transmission resources based on the signal strength of the second transmission resource.

For example, the scenario in FIG. 3 is still used as an example. In the resource selection window, the transmit-end device determines the at least K first transmission resources based on the signal strength of the second transmission resource. For example, the transmit-end device determines the first transmission resource in the resource selection window based on signal strength in the foregoing four DRX cycles by using the four DRX cycles as a group. If a value of K is 5, the transmit-end device determines at least five first transmission resources.

For example, S14012 may be specifically implemented as follows: The transmit-end device determines the at least K first transmission resources based on the signal strength of the second transmission resource if duration in which the second transmission resource overlaps the running time of the preset timer meets preset duration. In other words, the transmit-end device may determine a to-be-reserved first transmission resource in the resource selection window if the transmit-end device determines that detection duration of the second transmission resource meets duration of the sensing window.

S14013. The transmit-end device determines the k first transmission resources from the at least K first transmission resources based on a status of overlapping between the at least K first transmission resources and the running time of the second timer. For example, the k first transmission resources are resources in the K first transmission resources.

Figure 17:
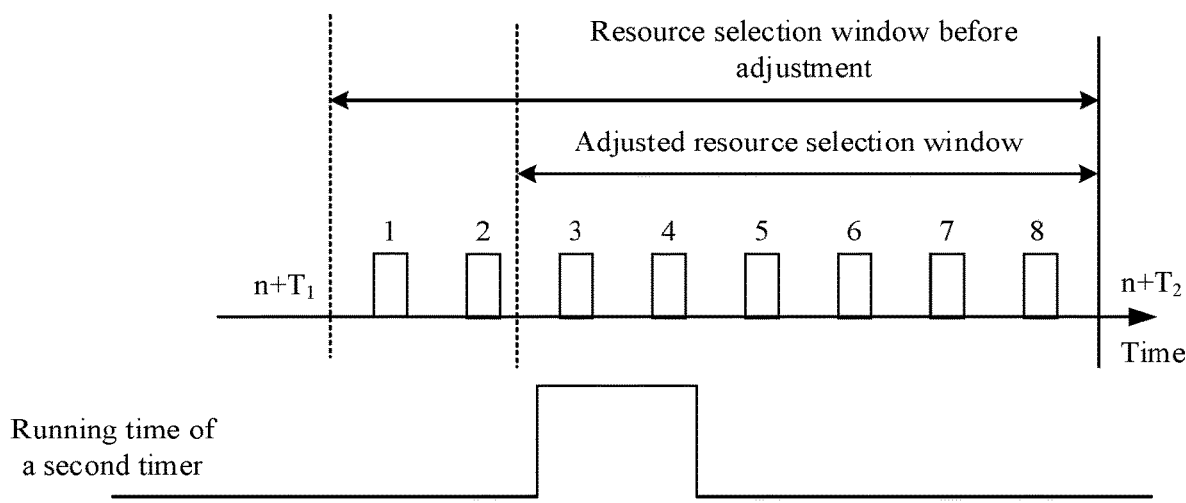
FIG. 17 is a schematic diagram of resource reservation location according to an embodiment of this application.

For example, referring to FIG. 17, the transmit-end device determines eight first transmission resources. The eight first transmission resources are respectively denoted as a transmission resource 1, a transmission resource 2, a transmission resource 3, a transmission resource 4, a transmission resource 5, a transmission resource 6, a transmission resource 7, and a transmission resource 8. For example, if all the eight first transmission resources do not overlap the running time of the second timer, no first transmission resource meeting a requirement exists in the resource selection window. If at least one of the eight first transmission resources overlaps the running time of the second timer, a first transmission resource meeting the requirement exists in the resource selection window. Further, if it is required that the k first transmission resources are the first k first transmission resources in the K first transmission resources, the transmit-end device adjusts a value of the parameter $T_1$ and/or a value of the parameter $T_2$ in the resource selection window based on a status of overlapping between the eight first transmission resources and the running time of the second timer. For example, the transmission resource 1 and the transmission resource 2 separately do not overlap the running time of the second timer, and the transmission resource 3 and the transmission resource 4 separately overlap the running time of the second timer, as shown in FIG. 17. In this case, the transmit-end device adjusts the value of the parameter $T_1$, so that an initial transmission resource in the resource selection window is the transmission resource 3, as shown by "adjusted resource selection window" in FIG. 17. For example, a transmission resource in a resource selection window corresponds to a transmission resource in a resource reservation periodicity. When the eight first transmission resources are aperiodic resources, and k=2, if the first two first transmission resources overlap the running time of the second timer, the first transmission resource may be determined. When the eight or more first transmission resources are periodic resources, a quantity of first transmission resources in each periodicity meets K=3, and k=2, if a $(3*(m-1)+1)^{th}$ first transmission resource and a $(3*(m-1)+2)^{th}$ first transmission resource overlap the running time of the second timer, the first transmission resource may be determined regardless of whether a $(3m)^{th}$ first transmission resource overlaps or does not overlap the running time of the second timer, where m is a positive integer.

In this way, the transmit-end device determines at least K first transmission resources based on the signal strength of the second transmission resource, and then determines, from the K first transmission resources with reference to a status of overlapping between the at least K first transmission resources and the running time of the second timer, k first transmission resources that overlap the running time of the second timer. The running time of the second timer of the transmit-end device is consistent with the running time of the second timer of the receive-end device. Therefore, when the transmit-end device sends the first SCI to the receive-end device by using the k first transmission resources, the receive-end device is also in an active periodicity and can receive the first SCI from the transmit-end device, thereby improving transmission validity of the first SCI.

S1402. The transmit-end device sends first SCI to a receive-end device on the k first transmission resources. Correspondingly, the receive-end device receives the first SCI from the first transmit-end device on the k first transmission resources.

For example, the k first transmission resources overlap the running time of the second timer. The running time of the second timer of the transmit-end device is consistent with running time of the second timer of the receive-end device. Therefore, when the transmit-end device sends the first SCI, the receive-end device is in an active periodicity and can receive the first SCI, so that the receive-end device can receive the first SCI in time.

According to the communications method provided in this embodiment of this application, the transmit-end device determines that the time domain resource that carries the first SCI and that is in the k first transmission resources overlaps the running time of the second timer. The running time of the second timer of the transmit-end device is consistent with running time of a second timer of the receive-end device. Therefore, when the transmit-end device sends the first SCI on the k first transmission resources, the receive-end device is in an active periodicity and can receive the first SCI, so that it is possible for the receive-end device to receive the first SCI in time, thereby improving transmission efficiency of the first SCI.

It should be noted that timers in both S1401 and S1402 refer to timers on the transmit-end device side. For example, the first timer refers to a first timer of the transmit-end device, the second timer refers to a second timer of the transmit-end device, and the retransmission timer refers to a retransmission timer of the transmit-end device.

In addition, in this embodiment of this application, "running time" may also be understood as "running duration".

The foregoing mainly describes the solutions provided in embodiments of this application from a perspective of interaction between different network elements. It may be understood that, to implement the foregoing functions, the receive-end device, the first transmit-end device, the second transmit-end device, and the transmit-end device include corresponding hardware structures and/or software modules that perform the functions. With reference to the examples described in the embodiments disclosed in this application, the units and algorithm steps can be implemented by hardware or a combination of hardware and computer software in embodiments of this application. Whether a function is performed by hardware or hardware driven by computer software depends on a particular application and a design constraint of the technical solutions. A person skilled in the art may use different methods to implement the described functions for each particular application, but it should not be considered that the implementation falls beyond the scope of the technical solutions in embodiments of this application.

In the embodiments of this application, the communications apparatus may be divided into functional units based on the foregoing method examples. For example, each functional unit corresponding to each function may be obtained through division, or two or more functions may be integrated into one processing unit. The integrated unit may be implemented in a form of hardware, or may be implemented in a form of a software function unit. It should be noted that, in embodiments of this application, division into the units is an example, and is merely logical function division. During actual implementation, another division manner may be used.

Figure 18:
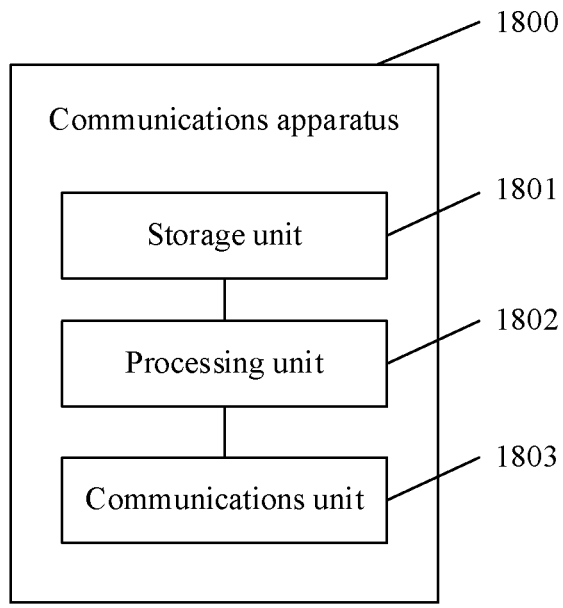
FIG. 18 is a schematic diagram of a structure of a communications apparatus according to an embodiment of this application.

FIG. 18 is a schematic block diagram of a communications apparatus according to an embodiment of this application. The communications apparatus 1800 may exist in a form of software, and may be a device or a component (such as a chip system) in the device. The communications apparatus 1800 includes a processing unit 1802 and a communications unit 1803.

The communications unit 1803 may further be divided into a sending unit (not shown in FIG. 18) and a receiving unit (not shown in FIG. 18). For example, the sending unit is configured to support the communications apparatus 1800 in sending information to another network element. The receiving unit is configured to support the communications apparatus 1800 in receiving information from another network element.

When the communications apparatus 1800 is configured to implement a function of the foregoing receive-end device, for example, the processing unit 1802 may be configured to support the communications apparatus 1800 in performing S802 and S803 in FIG. 8, performing S1102, S1104, and S1105 in FIG. 11, and/or performing another process of the solution described in this specification. The communications unit 1803 is configured to support communication between the communications apparatus 1800 and another network element (for example, a first transmit-end device, a second transmit-end device, and a transmit-end device). For example, the communications unit is configured to support the communications apparatus 1800 in performing S403 shown in FIG. 4, performing S801 shown in FIG. 8, performing S1103 shown in FIG. 11, performing S1402 shown in FIG. 14, and/or performing another process of the solution described in this specification.

When the communications apparatus 1800 is configured to implement a function of the first transmit-end device in the foregoing method, for example, the communications unit 1803 is configured to support communication between the communications apparatus 1800 and another network element (for example, a receive-end device). For example, the communications unit is configured to support the communications apparatus 1800 in performing S801 shown in FIG. 8 and/or performing another process of the solution described in this specification.

When the communications apparatus 1800 is configured to implement a function of the second transmit-end device in the foregoing method, for example, the communications unit 1803 is configured to support communication between the communications apparatus 1800 and another network element (for example, a receive-end device). For example, the communications unit is configured to support the communications apparatus 1800 in performing S1103 shown in FIG. 11 and/or performing another process of the solution described in this specification.

Figure 16:
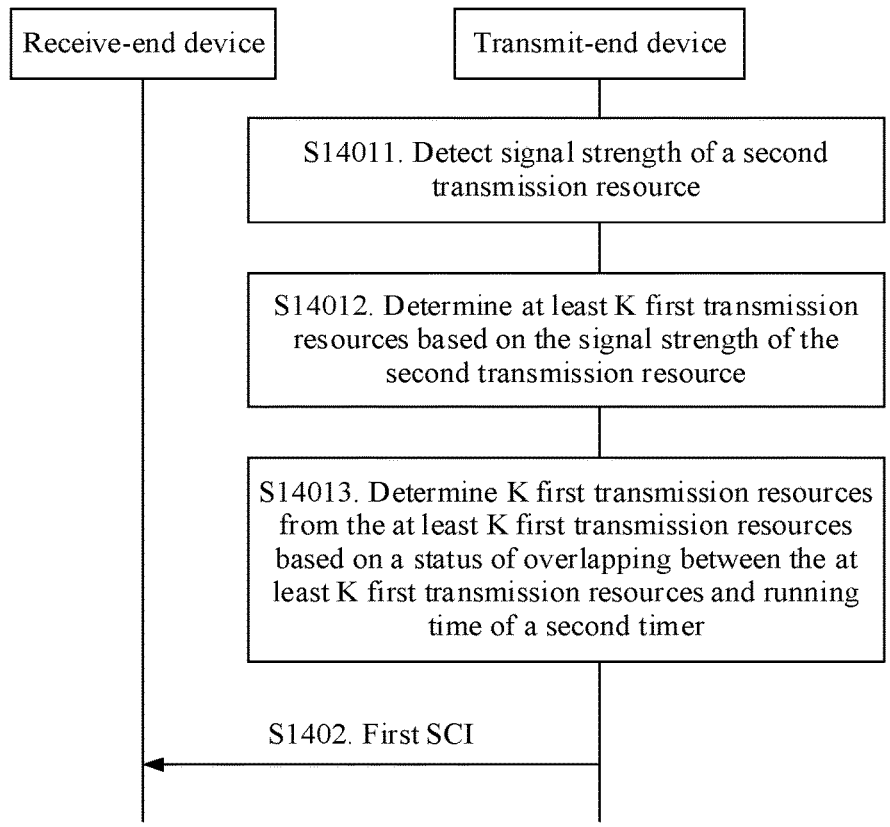
FIG. 16 is a schematic flowchart of another communications method according to an embodiment of this application.

When the communications apparatus 1800 is configured to implement a function of the foregoing transmit-end device, for example, the processing unit 1802 may be configured to support the communications apparatus 1800 in performing S1401 in FIG. 14, performing S14011, S14012, and S11013 in FIG. 16, and/or performing another process of the solution described in this specification. The communications unit 1803 is configured to support communication between the communications apparatus 1800 and another network element (for example, a receive-end device). For example, the communications unit is configured to support the communications apparatus 1800 in performing S1402 shown in FIG. 14 and/or performing another process of the solution described in this specification.

Optionally, the communications apparatus 1800 may further include a storage unit 1801, configured to store program code and data of the communications apparatus 1800, where the data may include but is not limited to original data or intermediate data.

For example, the processing unit 1802 may be a processor or a controller, for example, may be a CPU, a general-purpose processor, a digital signal processor (DSP), an application-specific integrated circuit (ASIC), a field programmable gate array (FPGA) or another programmable logic device, a transistor logic device, a hardware component, or any combination thereof. The processing unit 1802 may implement or execute logical blocks, modules, and circuits in various examples described with reference to content disclosed in this application. Alternatively, the processor may be a combination for implementing a computing function, for example, a combination of one or more microprocessors, or a combination of the DSP and a microprocessor.

The communications unit 1803 may be a communications interface, a transceiver, a transceiver circuit, or the like. For example, the communications interface is a general name. In specific implementation, the communications interface may include a plurality of interfaces, for example, may include an interface between a transmit-end device and a receive-end device and/or another interface.

The storage unit 1801 may be a memory.

When the processing unit 1802 is a processor, the communications unit 1803 is a communications interface, and the storage unit 1801 is a memory. A communications apparatus 1900 in the embodiments of this application may be shown in FIG. 19.

Figure 19:
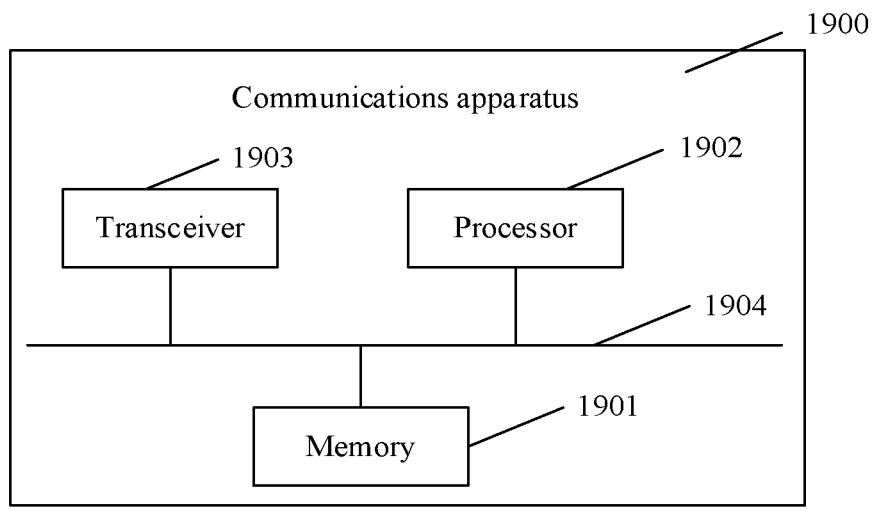
FIG. 19 is a schematic diagram of a structure of another communications apparatus according to an embodiment of this application.

Referring to FIG. 19, the communications apparatus 1900 includes a processor 1902, a transceiver 1903, and a memory 1901.

For example, the transceiver 1903 may be a transmitter independently disposed, and the transmitter may be configured to send information to another device; or the transceiver may be a receiver independently disposed, configured to receive information from another device. The transceiver may be a component that integrates information sending and receiving functions. Specific implementation of the transceiver is not limited in this embodiment of this application.

Optionally, the communications apparatus 1900 may further include a bus 1904. For example, the transceiver 1903, the processor1902, and the memory 1901 may be connected to each other by using the bus 1904. The bus 1904 may be a peripheral component interconnect (PCI) bus, an extended industry standard architecture (EISA) bus, or the like. The bus 1904 may be classified into an address bus, a data bus, a control bus, and the like. For ease of representation, only one bold line is used for representation in FIG. 19, but this does not mean that there is only one bus or only one type of bus.

A person of ordinary skill in the art may understand that all or a part of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network device (for example, a terminal device). Some or all of the units may be selected based on actual requirements to achieve the objectives of the solutions of embodiments.

In addition, functional units in embodiments of this application may be integrated into one processing unit, or each of the functional units may exist independently, or two or more units are integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to a necessary universal hardware or by hardware only. In most circumstances, the former is a preferred implementation. Based on such an understanding, the technical solutions of this application essentially or the part contributing to the conventional technology may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
    receiving, by a receive-end device, first sidelink control information (SCI) from a transmit-end device;
    starting, by the receive-end device, a first timer based on the first SCI, wherein first running time of the first timer is used by the receive-end device to monitor at least one of second SCI or information about sidelink data transmission; and
    determining, by the receive-end device, the first running time of the first timer based on at least one transmission resource indicated by the first SCI, wherein the first running time of the first timer overlaps at least a time domain resource that carries the second SCI.

2. The method according to claim 1, wherein the receiving the first SCI comprises:
    receiving, by the receive-end device, the first SCI from the transmit-end device in second running time of a second timer, wherein the second running time of the second timer is used by the receive-end device to monitor at least one of SCI or the information about the sidelink data transmission.

3. The method according to claim 1, wherein the starting the first timer comprises:
    starting, by the receive-end device, the first timer based on the receive-end device determining that sidelink transmission indicated by the first SCI is new transmission.

4. The method according to claim 1, wherein the starting the first timer comprises:
    starting, by the receive-end device, the first timer based on sidelink transmission indicated by the first SCI being new transmission; or
    starting, by the receive-end device, the first timer based on the sidelink transmission indicated by the first SCI not being new transmission and the sidelink transmission being new transmission for the receive-end device.

5. The method according to claim 1,
    wherein the first running time of the first timer comprises at least a first time domain resource that carries the second SCI and that is in a first initial transmission resource in an (F−1)-th resource reservation periodicity, and
    wherein a second time domain resource that carries the second SCI and that is in a second initial transmission resource in an F-th resource reservation periodicity overlaps a second running time of a second timer, and the first time domain resource that carries the second SCI and that is in the first initial transmission resource in the (F−1)-th resource reservation periodicity does not overlap the second running time of the second timer, F is a positive integer greater than 1, and the second running time of the second timer is used by the receive-end device to monitor at least one of SCI or the information about the sidelink data transmission.

6. The method according to claim 5,
    wherein an initial time domain resource that carries the second SCI and that is in the F-th resource reservation periodicity overlaps running time of a second discontinuous reception (DRX) cycle of the second timer, and
    wherein the second DRX cycle is after a first DRX cycle, and the first DRX cycle corresponds to a receiving moment of the first SCI and in which the second timer is located.

7. The method according to claim 1, wherein the starting the first timer is triggered by the receiving the first SCI.

8. An apparatus comprising:
    at least one processor; and
    a memory storing instructions for execution by the at least one processor, wherein, when executed, the instructions cause the apparatus to perform operations comprising:
        receiving first sidelink control information (SCI) from a transmit-end device;
        starting a first timer based on the first SCI, wherein first running time of the first timer is used by the apparatus to monitor at least one of second SCI or information about sidelink data transmission; and
        determining the first running time of the first timer based on at least one transmission resource indicated by the first SCI, wherein the first running time of the first timer overlaps at least a time domain resource that carries the second SCI.

9. The apparatus according to claim 8, wherein the receiving the first SCI comprises:
    receiving the first SCI from the transmit-end device in second running time of a second timer, wherein the second running time of the second timer is used by the apparatus to monitor at least one of SCI or the information about the sidelink data transmission.

10. The apparatus according to claim 8, wherein the starting the first timer comprises:
    starting the first timer based on the apparatus determining that sidelink transmission indicated by the first SCI is new transmission.

11. The apparatus according to claim 8, wherein the starting the first timer comprises:
    starting the first timer based on sidelink transmission indicated by the first SCI being new transmission; or
    starting the first timer based on the sidelink transmission indicated by the first SCI not being new transmission and the sidelink transmission being new transmission for the apparatus.

12. The apparatus according to claim 8,
    wherein the first running time of the first timer comprises at least a first time domain resource that carries the second SCI and that is in a first initial transmission resource in an (F−1)-th resource reservation periodicity, and
    wherein a second time domain resource that carries the second SCI and that is in a second initial transmission resource in an F-th resource reservation periodicity overlaps a second running time of a second timer, and the first time domain resource that carries the second SCI and that is in the first initial transmission resource in the (F−1)-th resource reservation periodicity does not overlap the second running time of the second timer, F is a positive integer greater than 1, and the second running time of the second timer is used by the apparatus to monitor at least one of SCI or the information about the sidelink data transmission.

13. The apparatus according to claim 12,
    wherein an initial time domain resource that carries the second SCI and that is in the F-th resource reservation periodicity overlaps running time of a second discontinuous reception (DRX) cycle of the second timer, and
    wherein the second DRX cycle is after a first DRX cycle, and the first DRX cycle corresponds to a receiving moment of the first SCI and in which the second timer is located.

14. An apparatus comprising:
at least one processor; and
a memory storing instructions for execution by the at least one processor, wherein, when executed, the instructions cause the apparatus to perform operations comprising:
  determining k first transmission resources, wherein a first time domain resource that carries first sidelink control information (SCI) and that is in the k first transmission resources overlaps second running time of a second timer, k is a positive integer, k≥1, the k first transmission resources are reserved by the apparatus, and the second running time of the second timer is used by the apparatus to monitor at least one of SCI or information about sidelink data transmission, wherein the determining the k first transmission resources comprises:
  detecting signal strength of a second transmission resource, wherein the second transmission resource overlaps running time of a preset timer,
  determining at least K first transmission resources based on the signal strength of the second transmission resource, and
  determining the k first transmission resources from the at least K first transmission resources based on a status of overlapping between the at least K first transmission resources and the second running time of the second timer; and
  sending the first SCI to a receive-end device on the k first transmission resources.

15. The apparatus according to claim 14, wherein the k first transmission resources are first k first transmission resources in the K first transmission resources, the K first transmission resources are reserved by the apparatus, and K is a positive integer.

16. The apparatus according to claim 14, the operations further comprising:
  receiving second configuration information from a network device, wherein the second configuration information indicates a value of k.

17. The apparatus according to claim 14, wherein the preset timer comprises at least one of:
  a first timer, wherein first running time of the first timer is used to monitor at least one of the SCI or the information about the sidelink data transmission,
  the second timer, or
  a retransmission timer.

18. The apparatus according to claim 14, wherein the k first transmission resources are in one resource reservation periodicity.

* * * * *